(12) United States Patent
Annakov et al.

(10) Patent No.: US 12,299,760 B2
(45) Date of Patent: May 13, 2025

(54) DISTRIBUTED SERVICE-AND-TRANSACTION SYSTEM

(71) Applicant: LiFE in the Air, Inc., Bellevue, WA (US)

(72) Inventors: Bayram Annakov, Seattle, WA (US); Sergey Pronin, Minusinsk (RU); Timur Abdukerimov, Krasnogorsk (RU)

(73) Assignee: Life In the Air, Inc., Bellevue, WA (US)

( * ) Notice: Subject to any disclaimer, the term of this patent is extended or adjusted under 35 U.S.C. 154(b) by 545 days.

(21) Appl. No.: 16/902,544

(22) Filed: Jun. 16, 2020

(65) Prior Publication Data
US 2021/0398239 A1    Dec. 23, 2021

(51) Int. Cl.
| | |
|---|---|
| G06Q 50/40 | (2024.01) |
| G06F 1/30 | (2006.01) |
| G06F 9/50 | (2006.01) |
| G06Q 10/02 | (2012.01) |
| G06Q 20/14 | (2012.01) |
| G06Q 30/0601 | (2023.01) |

(52) U.S. Cl.
CPC .............. *G06Q 50/40* (2024.01); *G06F 1/30* (2013.01); *G06F 9/5044* (2013.01); *G06F 9/5083* (2013.01); *G06F 9/5094* (2013.01); *G06Q 10/02* (2013.01); *G06Q 20/14* (2013.01); *G06Q 30/0601* (2013.01)

(58) Field of Classification Search
CPC .................................................... G06Q 50/30
See application file for complete search history.

(56) References Cited

U.S. PATENT DOCUMENTS

| | | | | |
|---|---|---|---|---|
| 9,665,998 | B1 * | 5/2017 | Shields | |
| 2013/0268303 | A1 * | 10/2013 | Messier | G06Q 10/02 |
| 2015/0242888 | A1 * | 8/2015 | Zises | G06Q 30/02 |
| 2020/0342040 | A1 * | 10/2020 | Adams | G06F 16/9535 |
| 2021/0027209 | A1 * | 1/2021 | Sankrithi | |

FOREIGN PATENT DOCUMENTS

| | | | | |
|---|---|---|---|---|
| CA | 3090157 | * | 2/2021 | H04B 7/185 |

OTHER PUBLICATIONS

Rula, et al., in "A First Look at In-Flight Internet Connectivity," from Web of Things, Mobile and Ubiquitous Computer, 2018 (Year: 2018).*

* cited by examiner

*Primary Examiner* — Olabode Akintola
*Assistant Examiner* — Brandon M Duck
(74) *Attorney, Agent, or Firm* — Olympic Patent Works PLLC

(57) ABSTRACT

The current document is directed to semi-automated service-and-transaction systems that provide information, communications, and transaction services to passengers traveling within various types of vehicles, including commercial airliners. The currently disclosed semi-automated service-and-transaction systems interconnect passenger smart phones, laptops, tablets, and other personal, processor-controlled computing and communications devices with an on-board hub-and-server component and processor-controlled computing and communications devices used by transportation personnel, including flight attendants on commercial aircraft. The on-board hub-and-server component interfaces to a distributed-service-and-transaction application within a remote cloud-computing facility.

6 Claims, 43 Drawing Sheets

```
get_constraints                    ─ 1816

(in: ID;
out: constraints)
```

```
constraints =

SELECT  Constraints
  FROM    Seats
  WHERE   SeatID = ID
```

```
set_seat                           ─ 1818

(in: pID,
     sID;
out: )
```

```
UPDATE  Passengers
SET     SeatID = sID
WHERE   PID = pID
```

```
get_passengers                     ─ 1820

(in: currentFlight;
out: result set of
     (pID, sID, dA))
```

```
result =

SELECT  p.PID, p.SeatID, d.DAddress
  FROM    Passengers p, PassDevices d
  WHERE   p.FlightID = currentFlight AND
          p.PID = d.PID
```

```
get_flight_attendants              ─ 1822

(in: currentFlight;
out: result set of (fID, dA))
```

```
result =

SELECT  f.FID, d.DAddress
  FROM    flightAttendants f, FADevices d
  WHERE   f.FlightID = currentFlight AND
          f.FID = d.FID
```

```
get_row_aisle_status               ─ 1824

(in: currentFlight;
out: result set of (row, aisle,
status, price, ID) tuples)
```

```
results =

SELECT  s.Row, s.Aisle, i.Status, i.Price,
          i.SeatID
  FROM    Seats s, SeatInfo i
  WHERE   i.FlightID = currentFlight AND
          s.SeatID = i.SeatID
```

```
get_seat_map                       ─ 1826

(in: currentFlight;
out: map)
```

```
map =

SELECT  SeatingImage
  FROM    Flights
  WHERE   FlightID = currentFlight
```

FIG. 18B

DISTRIBUTED SERVICE-AND-TRANSACTION SYSTEM

TECHNICAL FIELD

The current document is directed to semi-automated service-provision systems and distributed database systems and is directed, in particular, to a semi-automated service-provision and transaction system incorporated in commercial aircraft and in other transportation systems.

BACKGROUND

Since the beginning of public transportation services, transportation services have provided various types of on-board services and transactions within various types of public-transportation vehicles, including steamships, passenger railway cars, buses, and commercial airliners. Early systems were entirely manual, featuring transportation-system personnel who provided services and transactions directly to passengers, including railway conductors, various types of steamship personnel, and airline stewardesses. In order to facilitate service provision, various types of mechanical and electro-mechanical systems were developed to allow passengers to easily and quickly summon transportation-system personnel and to communicate concerns and requests, including mechanical cable systems and simple electrical signaling systems. Over time, with the evolution of electronics and electronic-communications systems, more complex systems were provided for which many additional features and facilities were developed. For example, airline passengers were provided electromechanical consoles for summoning flight attendants and selecting audio and audiovisual entertainment provided through audiovisual presentation systems.

As the complexities and feature sets of service-and-transaction systems within transportation vehicles has increased, the acquisition, installation, and maintenance costs have correspondingly increased. In addition, installed systems tend to be rather static, and are costly and difficult to update in order to track rapidly emerging technologies. For example, the emergence of personal, powerful, handheld computational and communications systems, including smart phones, laptops, and tablets, provides platforms for rapidly evolving entertainment and communications facilities and features that far outpace those provided by the relatively static, conventional hard-wired service-and-transaction systems installed in commercial aircraft and other transportation vehicles. As another example, the emergence of cloud-computing technologies currently provides relatively inexpensive and efficient access to vast information-storage services and computational services without associated data-center-acquisition, installation, and maintenance costs. As these types of technologies advance, conventional hard-wired, legacy service-and-transaction systems have quickly become obsolete. Public transportation systems have thus recognized the need for better leveraging new communications and computational technologies and widespread personal access to these technologies to provide more elaborate and contemporary services and transactions to passengers, including airline passengers traveling in commercial aircraft.

SUMMARY

The current document is directed to semi-automated service-and-transaction systems that provide information, communications, and transaction services to passengers traveling within various types of vehicles, including commercial airliners. The currently disclosed semi-automated service-and-transaction systems interconnect passenger smart phones, laptops, tablets, and other personal, processor-controlled computing and communications devices with an on-board hub-and-server component and processor-controlled computing and communications devices used by transportation personnel, including flight attendants on commercial aircraft. The on-board hub-and-server component interfaces to a distributed-service-and-transaction application within a remote cloud-computing facility. The currently disclosed semi-automated service-and-transaction systems thus leverage the powerful personal computing and communications platforms now available to passengers and employ distributed computational services provided by cloud-computing facilities to provide a robust service-and-transaction system that takes advantage of the rapid evolution of personal computing devices and cloud-computing facilities while avoiding large technology-acquisition, installation, and maintenance costs that would be necessary to continuously update conventional hard-wired service-and-transaction systems to track evolution of personal computing devices and cloud-computing facilities.

BRIEF DESCRIPTION OF THE DRAWINGS

FIGS. 18A-B provide various simple routines, used in subsequent control-flow diagrams, and corresponding structured query language ("SQL") implementations of the routines.

DETAILED DESCRIPTION

Figure 1:
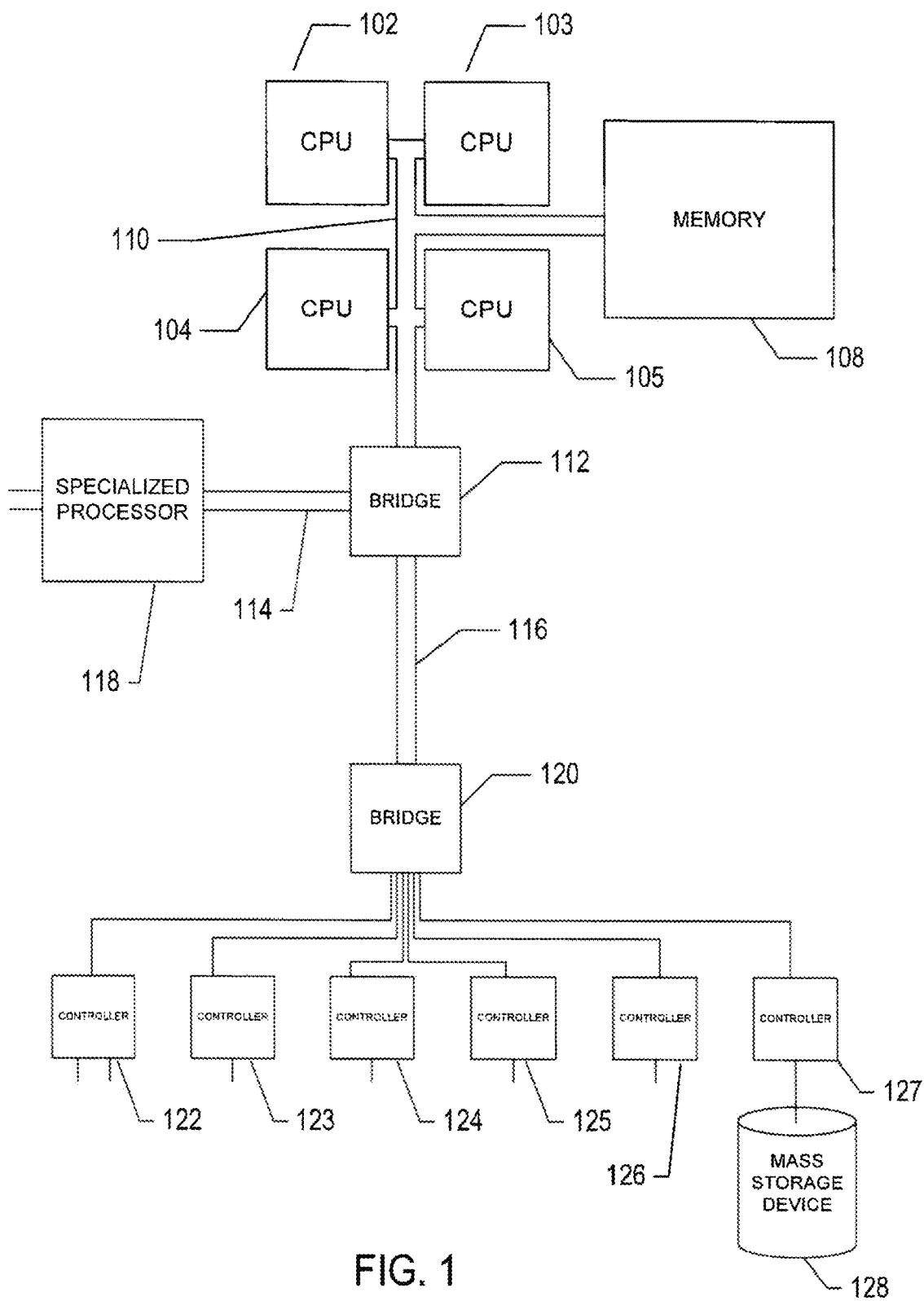
FIG. 1 provides a general architectural diagram for various types of computers.

The current document is directed to a semi-automated service-provision and transaction system incorporated in commercial aircraft and in other transportation systems. In a first subsection, below, a detailed description of computer hardware, complex computational systems, and virtualization is provided with reference to FIGS. 1-5B. In a second subsection, implementations of the currently disclosed semi-automated service-provision and transaction systems are discussed with reference to FIGS. 6-20L.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
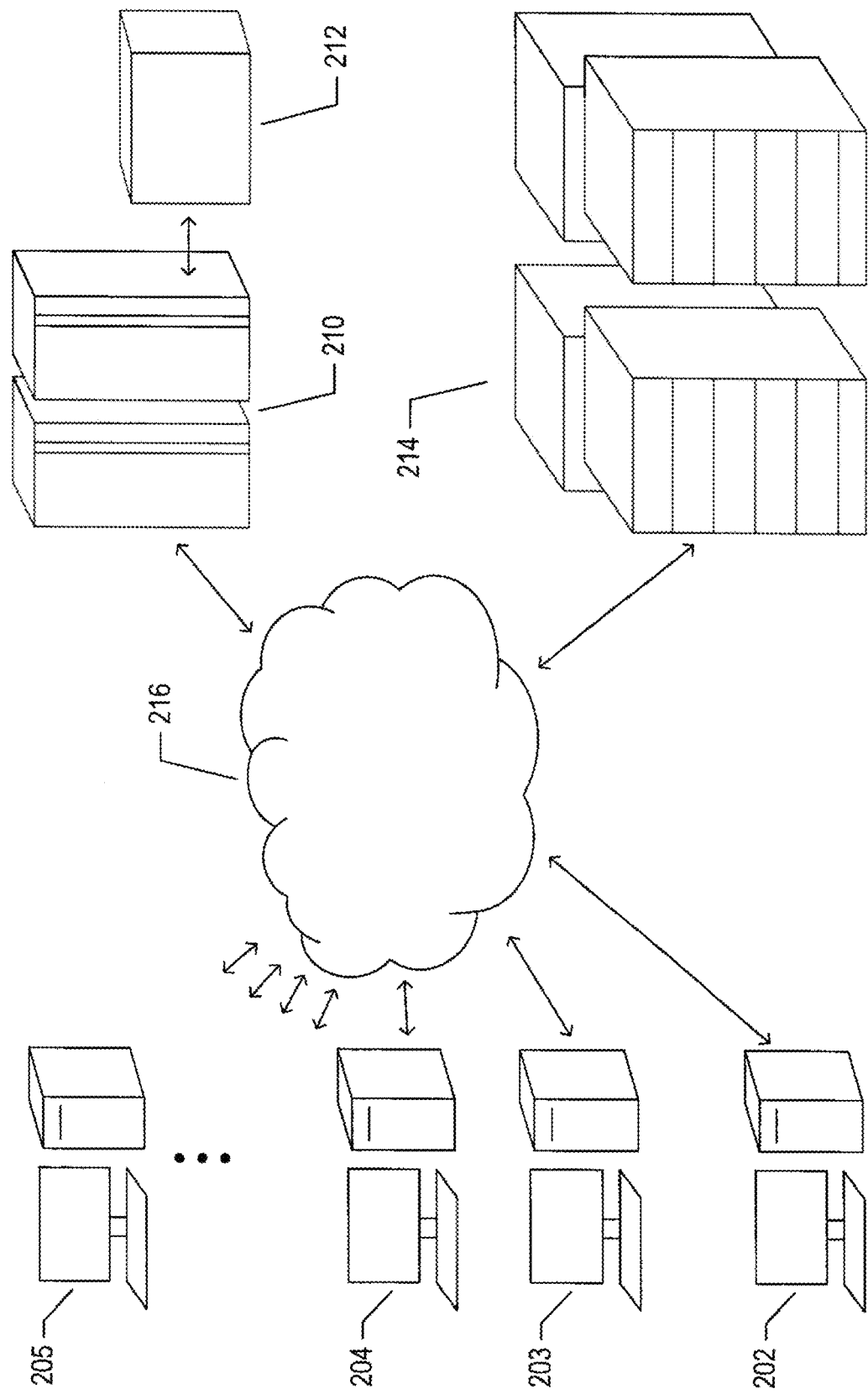
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
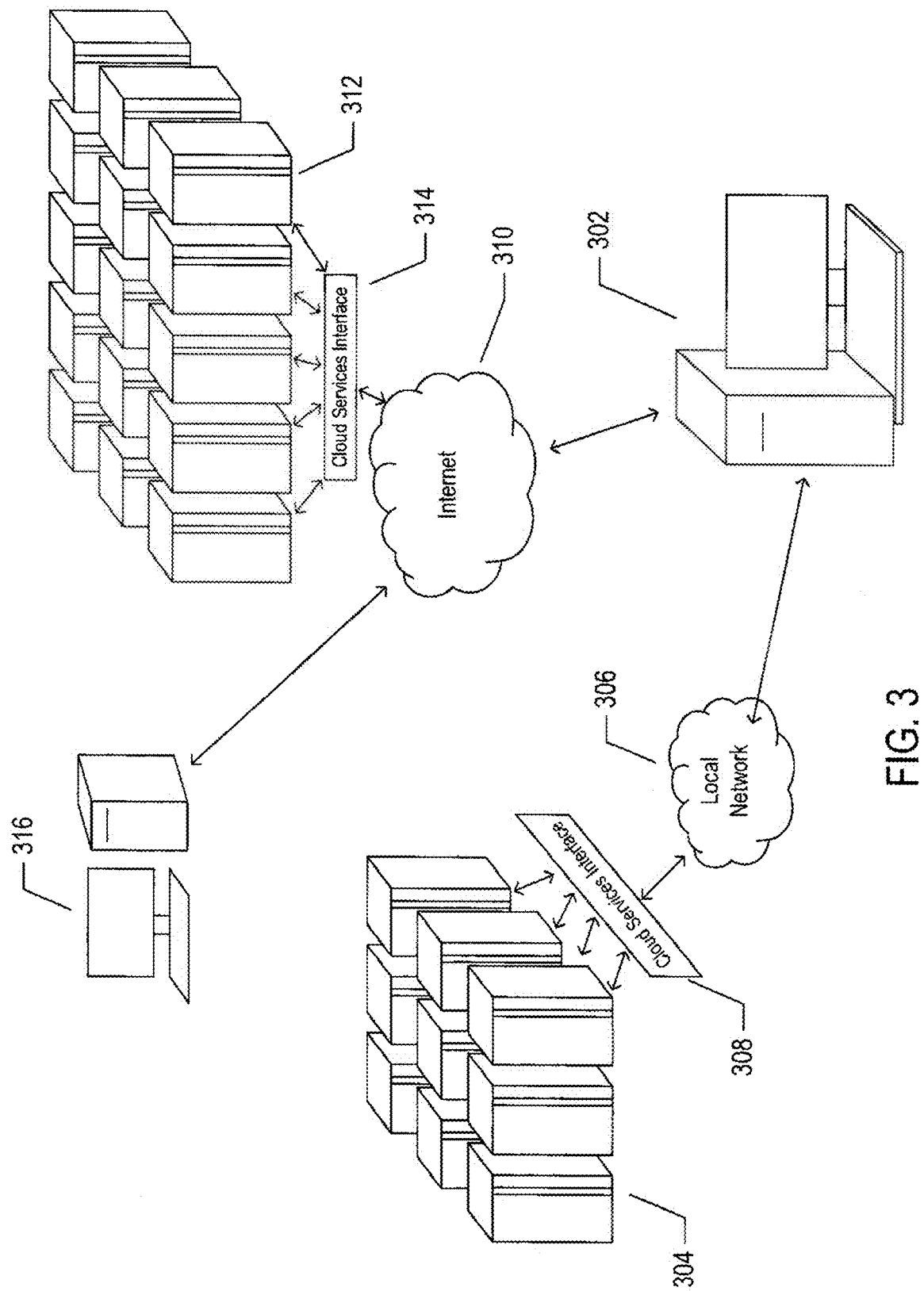
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services in a similar fashion to provision of electrical power and water to consumers by utility companies. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
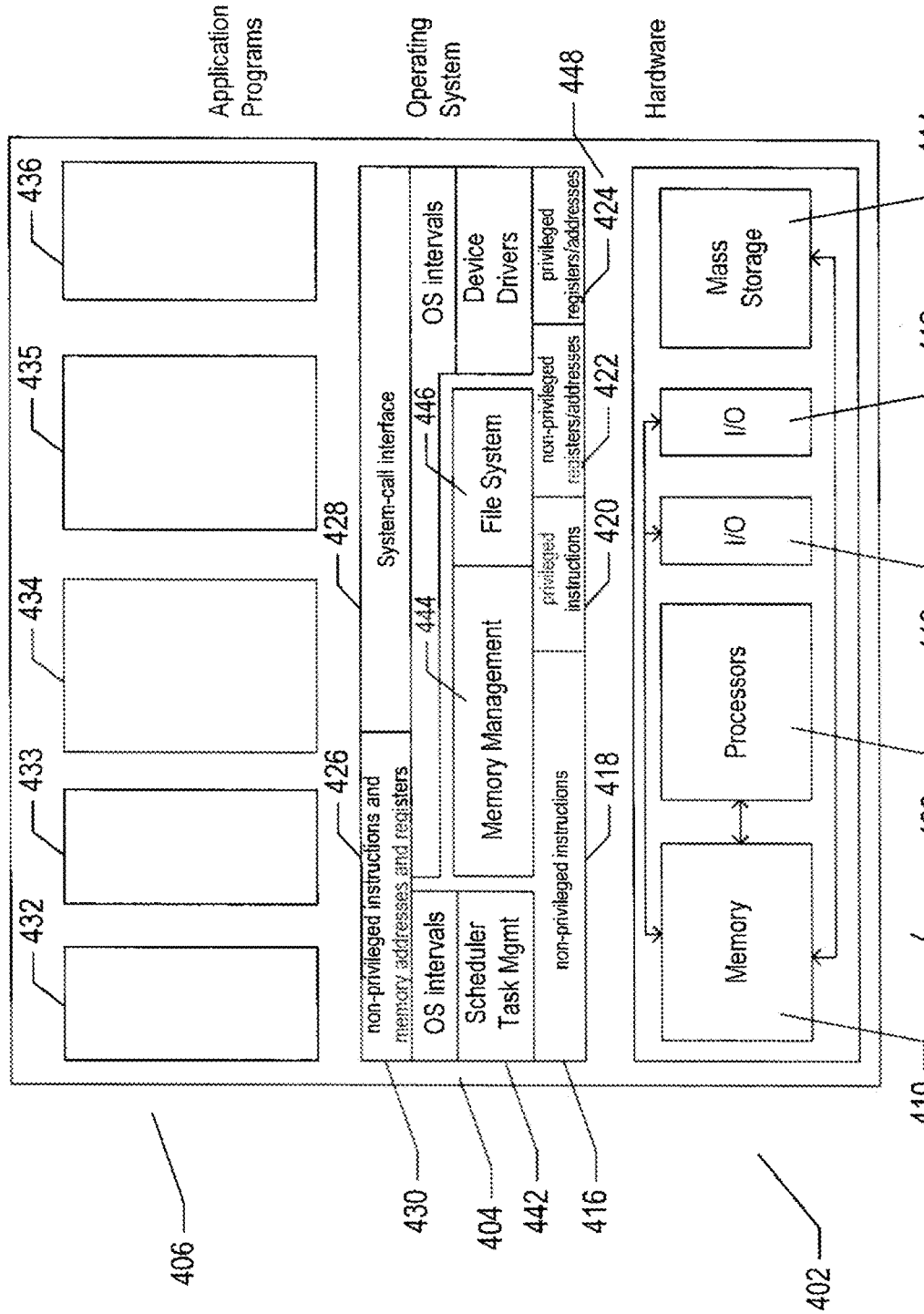
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
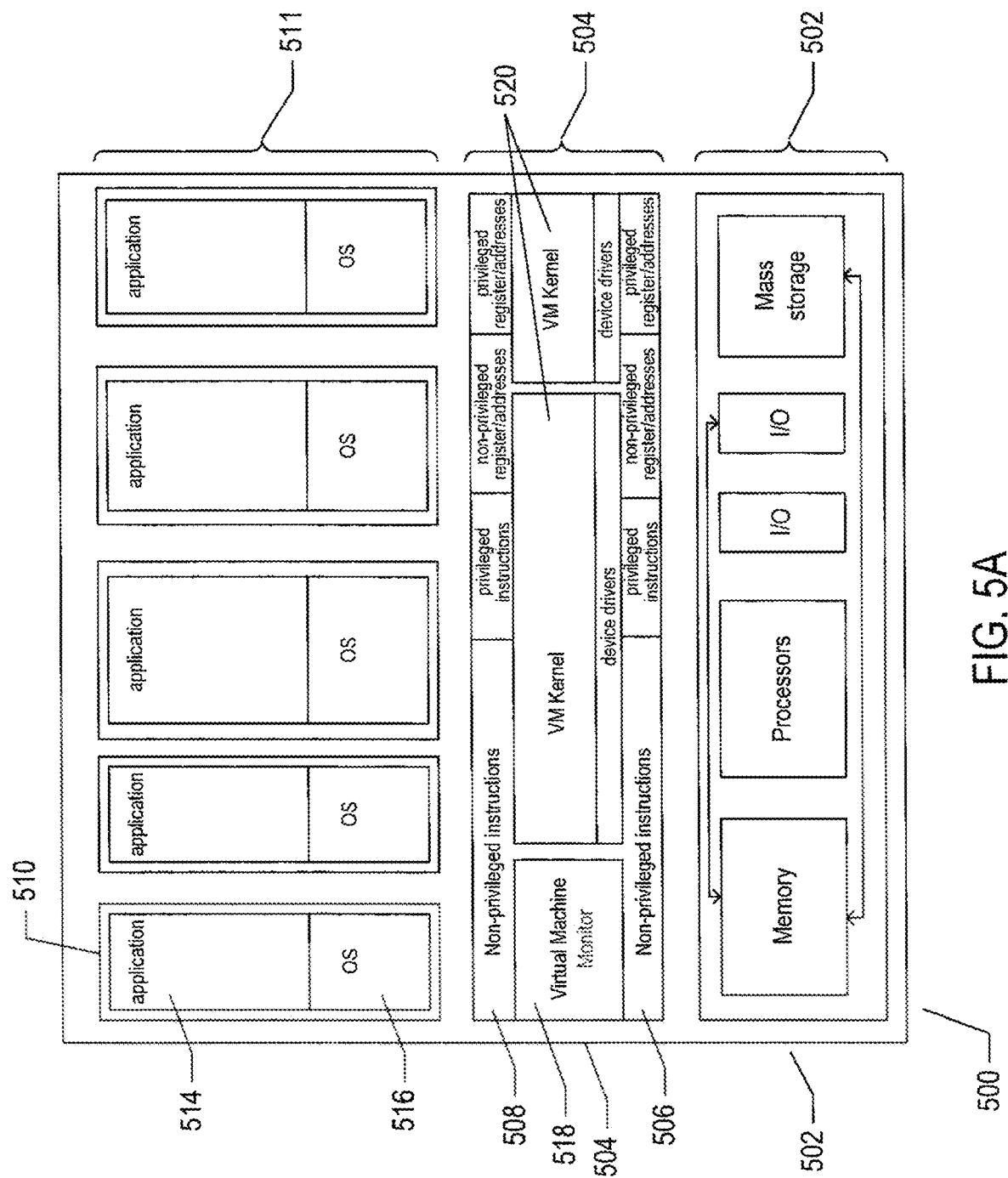
FIGS. 5A-B illustrate two types of virtual machine and virtual-machine execution environments.
Figure 5B:
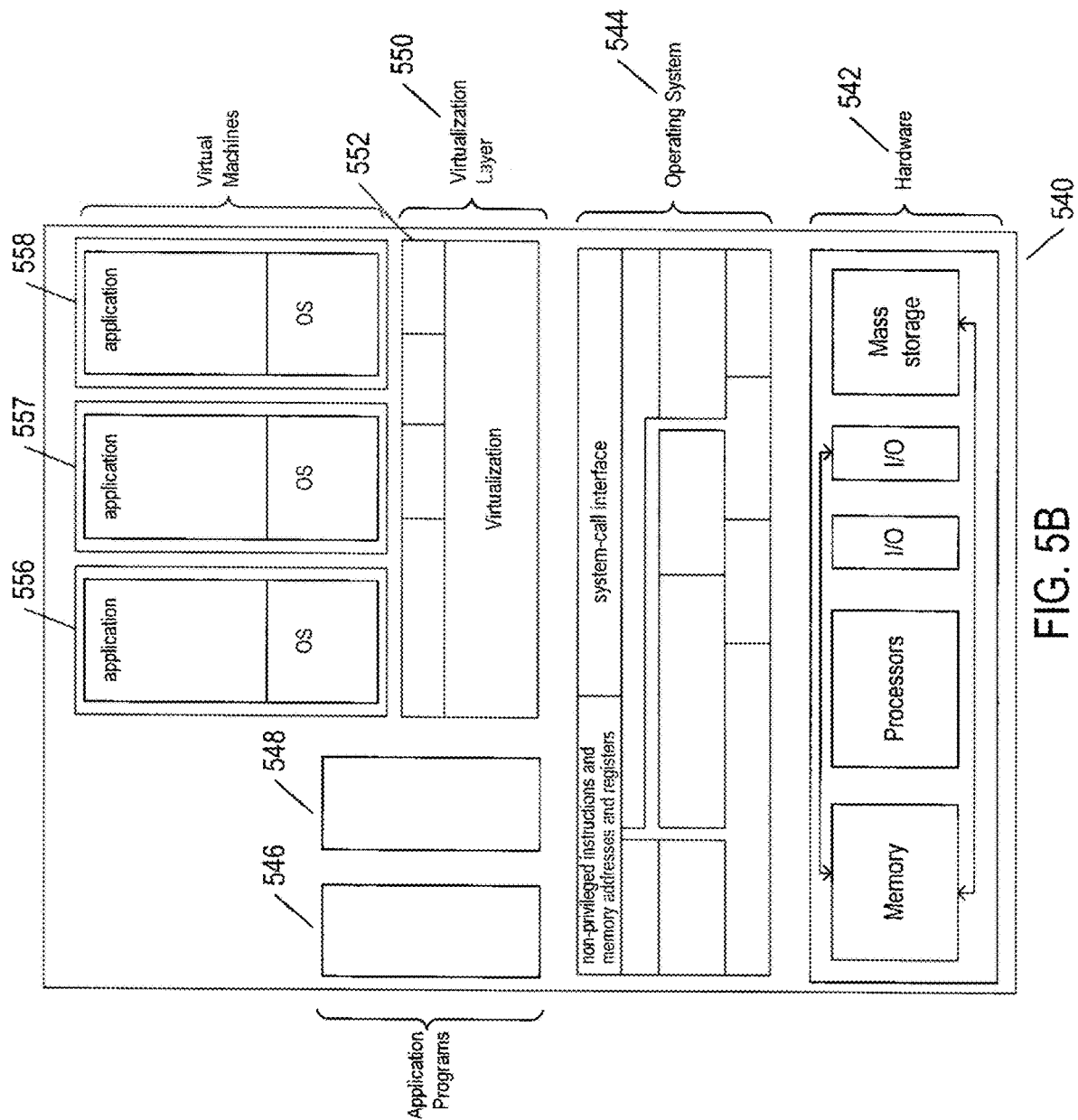

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

The Currently Disclosed Semi-Automated Service-and-Transaction System

Figure 6:
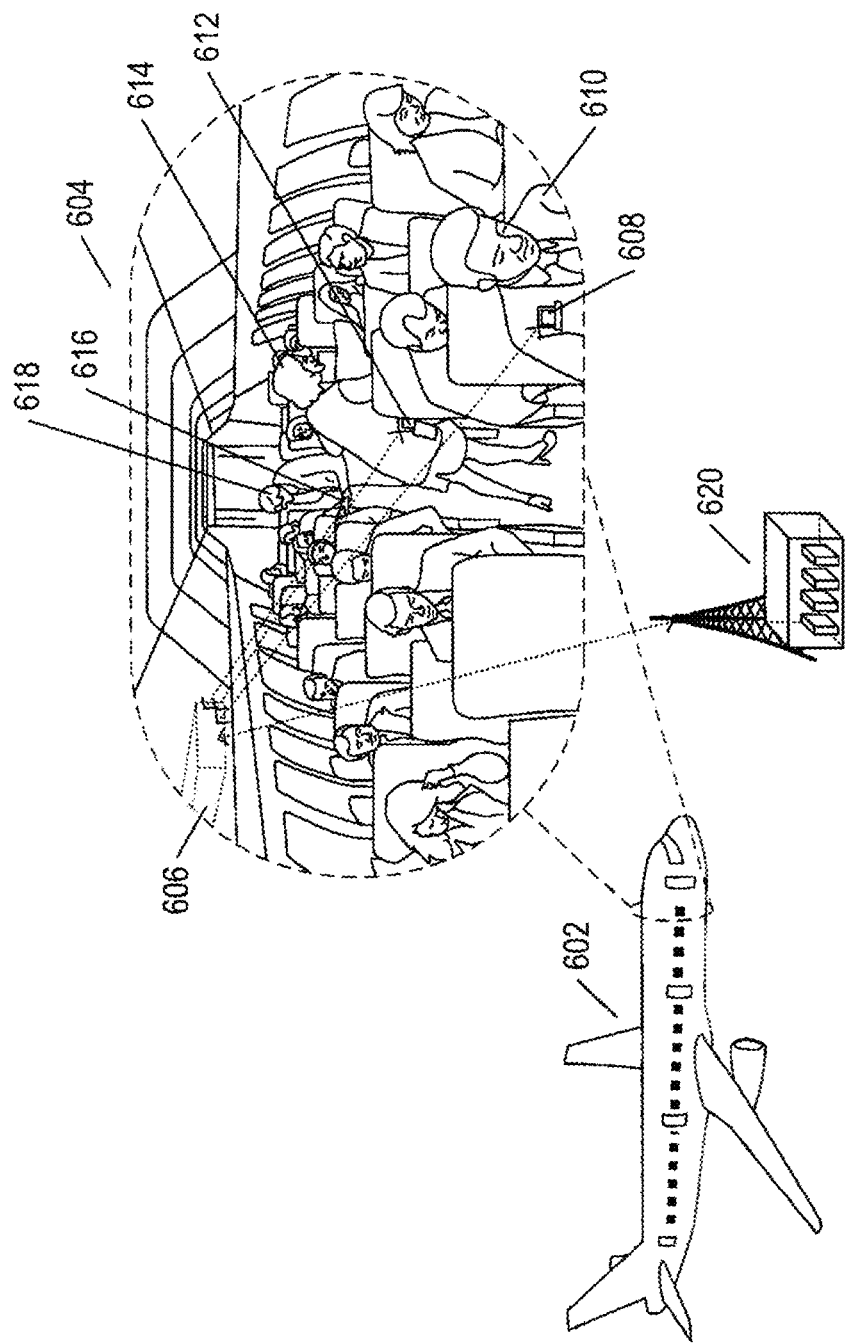
FIG. 6 illustrates features of one implementation of the currently disclosed semi-automated service-and-transaction system ("STS").

FIG. 6 illustrates features of one implementation of the currently disclosed semi-automated service-and-transaction system ("STK"). The STS implementation illustrated in FIG. 6 provides communications services, information services, and transaction services to passengers within a commercial airliner 602. Inset 604 illustrates components of the STS within a commercial airliner. In the illustrated implementation, a hub-and-server component 606 is located within an overhead baggage compartment. Passenger devices, such as smart phone 608 in the lapel pocket of passenger 610, communicate with the hub-and-server component via wireless, radio-frequency communications. Similarly, flight-attendant devices, such as the smart phone 612 carried by flight attendant 614 or the tablet 616 being used by flight attendant 618, also communicate with the hub-and-server component 606 via wireless, radio-frequency communications. The hub-and-server component 606 can communicate, by broadband communications, with a distributed STS backend application running within one or more cloud-computing facilities, such as cloud-computing facility 620. The one or more cloud-computing facilities support a distributed database, which includes electronically stored information, including information about passengers, transportation personnel, transportation vehicles, and other such information, portions of which are additionally distributed among the hub-and-server components within transportation vehicles. The one or more cloud-computing facilities additionally store, using distributed data-storage technologies, entertainment information, such as movies, audio recordings, and other such information. The cloud-computing facility also includes a transaction-processing subsystem of the distributed STS backend application that carries out financial transactions on behalf, of passengers, including purchases of entertainment, services, and products. In certain cases, the hub-and-server components operate independently from the cloud-computing facilities during flight.

Figure 7A:
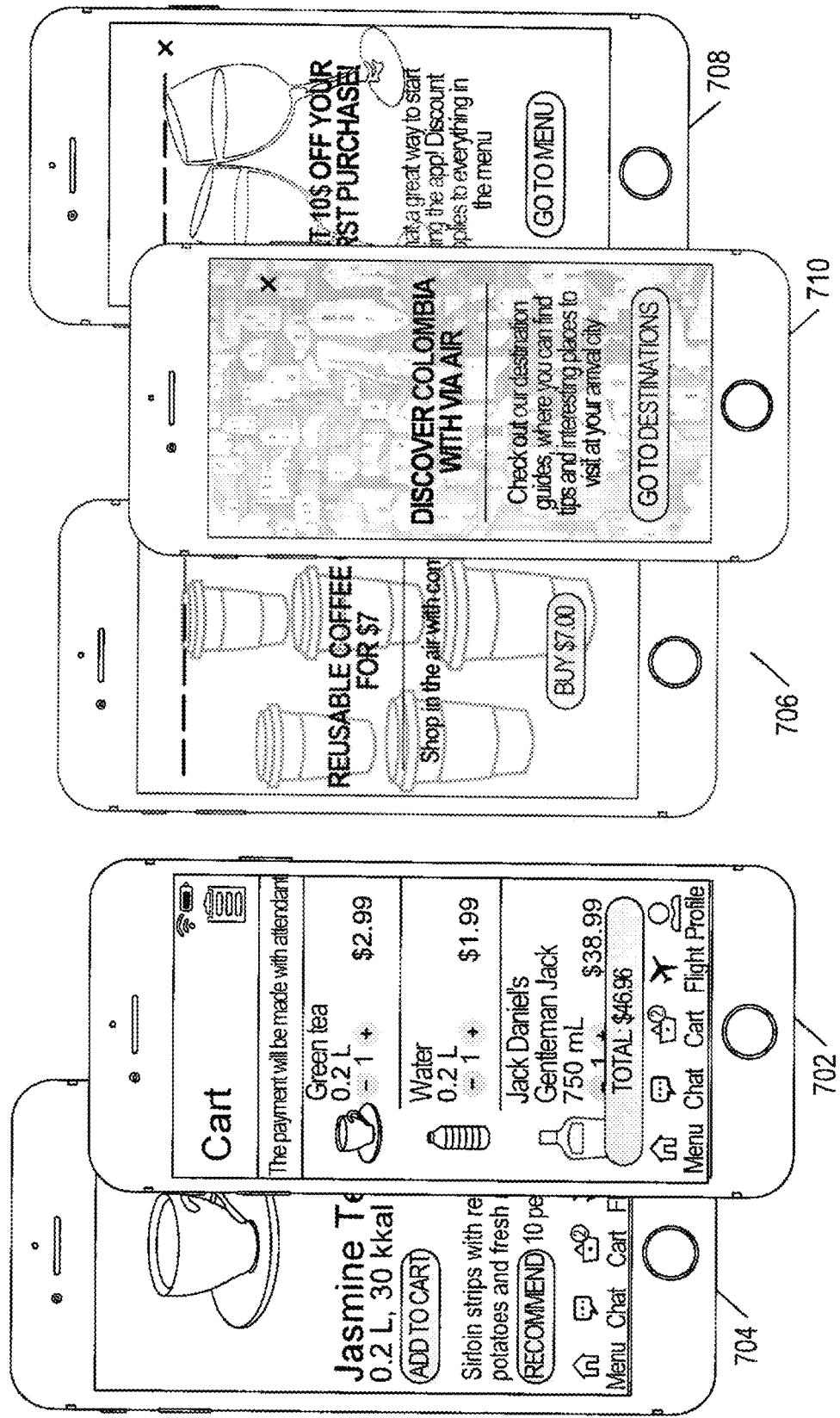
FIGS. 7A-E show examples of many of the different types of communications, information, and transaction services provided by the currently disclosed STS.
Figure 7B:

FIGS. 7A-E show examples of many of the different types of communications, information, and transaction services provided by the currently disclosed STS. The STS supports web services and client applications for a variety of different types of personal computing and communications devices, including web applications that can be accessed via common browsers and client applications downloaded to common types of smart phones and personal computers. The client applications interface to an STS server application and client web browsers interface to an STS client service, both of which are provided by the on-board hub-and-server component. These applications can provide a wide variety of different types of information and communications services. FIGS. 7A-B show example client-application-user-interface screens displayed on passenger smart phones. As shown in FIG. 7A, the web services and client applications provide cart menus 702, with detailed cart-item information displays 704, that allow passengers to view the variety of items available via cart service from flight attendants and to order items from the cart service. The web services and client applications provide general advertisements 706, advertisements indicating the availability of special deals 708, and various types of informational announcements 710. As shown in FIG. 7B, the web services and client applications provide various types of magazine-like information presentations 712, access to various types of entertainment, including movies and audio recordings 714, detailed menus for food service 716, a chat service 718 that allows passengers to communicate with one another and with transportation personnel, and a flight-community social network 720 that allows, for example, passengers to post comments and transportation personnel to provide flight information and other types of information.

Figure 7C:
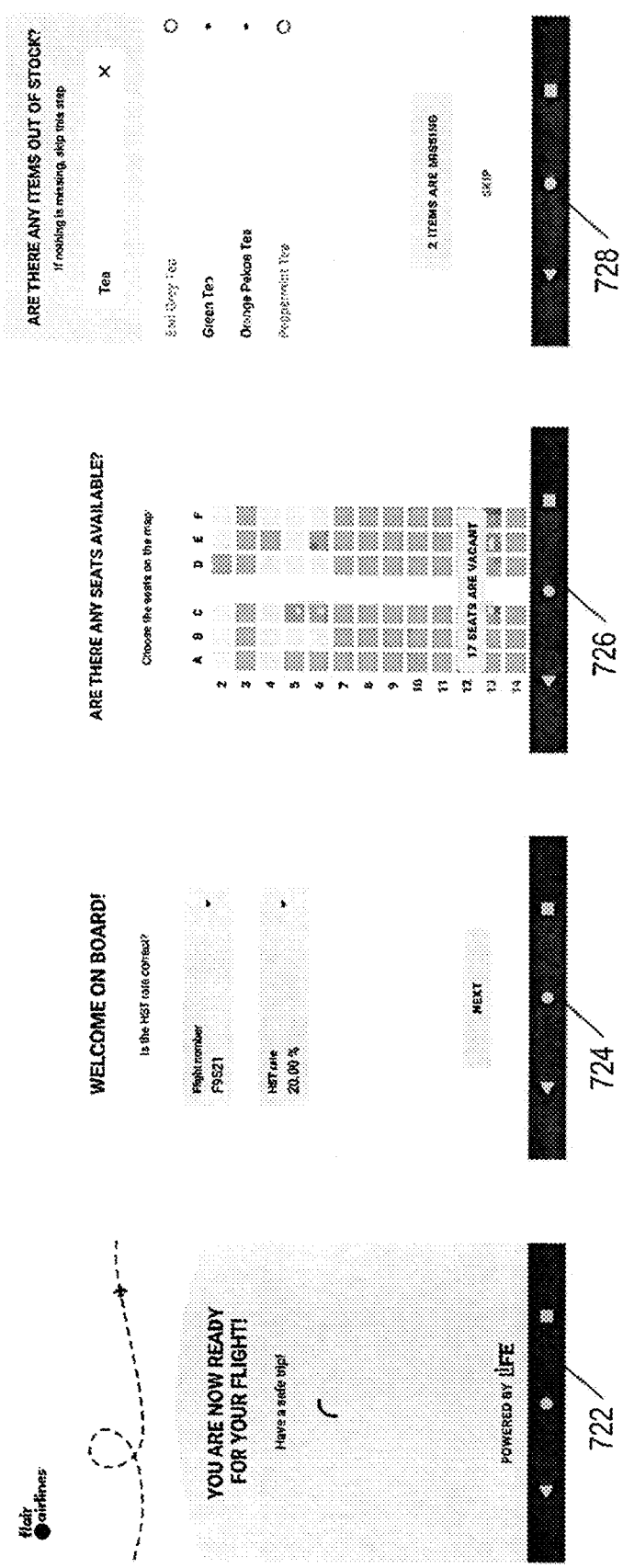
Figure 7D:
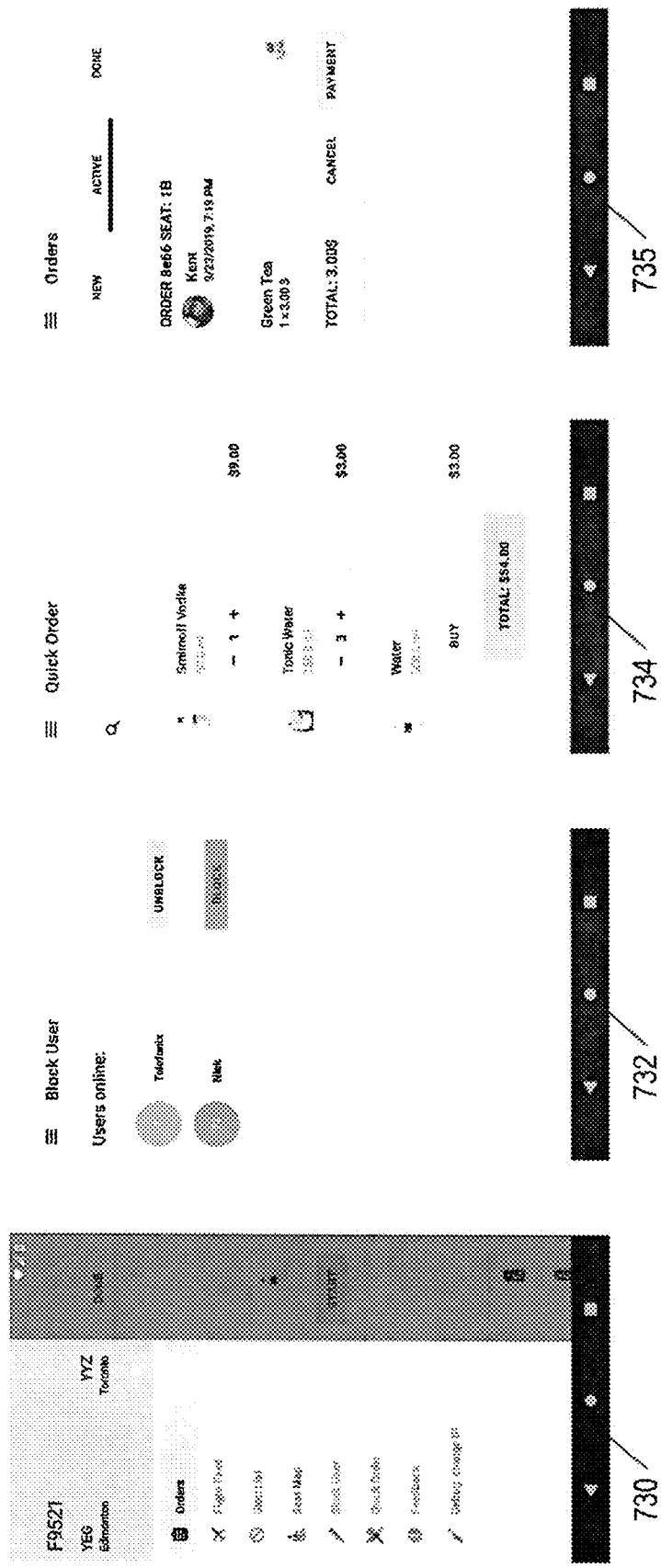
Figure 7E:

As shown in FIGS. 7C-E, web applications and transportation-personnel applications provide interfaces, on communications and computational devices used by transportation personnel, to many different types of functionalities and facilities that facilitate service provision to passengers. The STS supports web services and flight-attendant applications for a variety of different types of computing and communications devices, including web applications that can be accessed via common browsers and flight-attendant applications downloaded to common types of smart phones and personal computers. Flight-attendant devices, for example, execute flight-attendant applications that provide information to, and elicit provision of information by, flight attendants during each stage of a commercial flight, from initial preparations prior to passenger boarding until the flight attendants and crew are ready to disembark the aircraft following completion of a flight. The flight-attendant application, as shown in FIG. 7C, provides indications of the stages of a flight, as well as indications that information related to a particular stage has been successfully obtained 722, requests confirmation of flight information 724, requests indications of empty seats 726, and requests information about the current availabilities of menu items and other items that can be requested by passengers 728. As shown in FIG. 7D, the flight-attendant application provides various types of selectable information 730, various types of control panels 732 that allow, for example, flight attendants to control service provision to passengers, and various types of order-related information 734-735. As shown in FIG. 7E, a dashboard interface to an administration facility 740 is provided on a tablet or laptop used by a flight administrator or provided to a personal computer or workstation used by a remote administrator.

The examples of the types of information services, communications services, and transaction services that can be provided by the currently disclosed STS, shown in FIGS. 7A-E, are, by no means, comprehensive. Because the currently disclosed STS leverages personal communications and computing devices owned by passengers and similar modern devices and technologies provided to transportation personnel, including flight attendants, and because the currently disclosed STS is a distributed system spanning personal devices, personnel devices, on-board hub-and-server components, and remote cloud-computing facilities, the currently disclosed STS is able to take advantage of rapidly evolving technologies and facilities available in modern computing and electronics-communications environments to provide any type of service that can be implemented in those environments. Unlike in conventional, hard-wired service-and-transaction systems, the currently disclosed STS can be updated and modified as quickly as the web-applications, client-applications, and transportation-personnel applications can be modified, along with modification of corresponding supporting functionality and services provided by the on-board hub-and-server components and the cloud-computing facility. For example, should new 3-D-movie viewing application become available for personal computing and communications devices, that application can be immediately incorporated within the STS to provide a 3-D-movie-viewing service to passengers. In addition, because of the flexible and high-computational-bandwidth support provided by the on-board hub-and-server components and the cloud-computing facility, many types of currently available, sophisticated machine-learning and natural-language-processing technologies can be used to provide very flexible, conversation-like interactions between passengers, transportation personnel, and the STS.

Figure 8A:
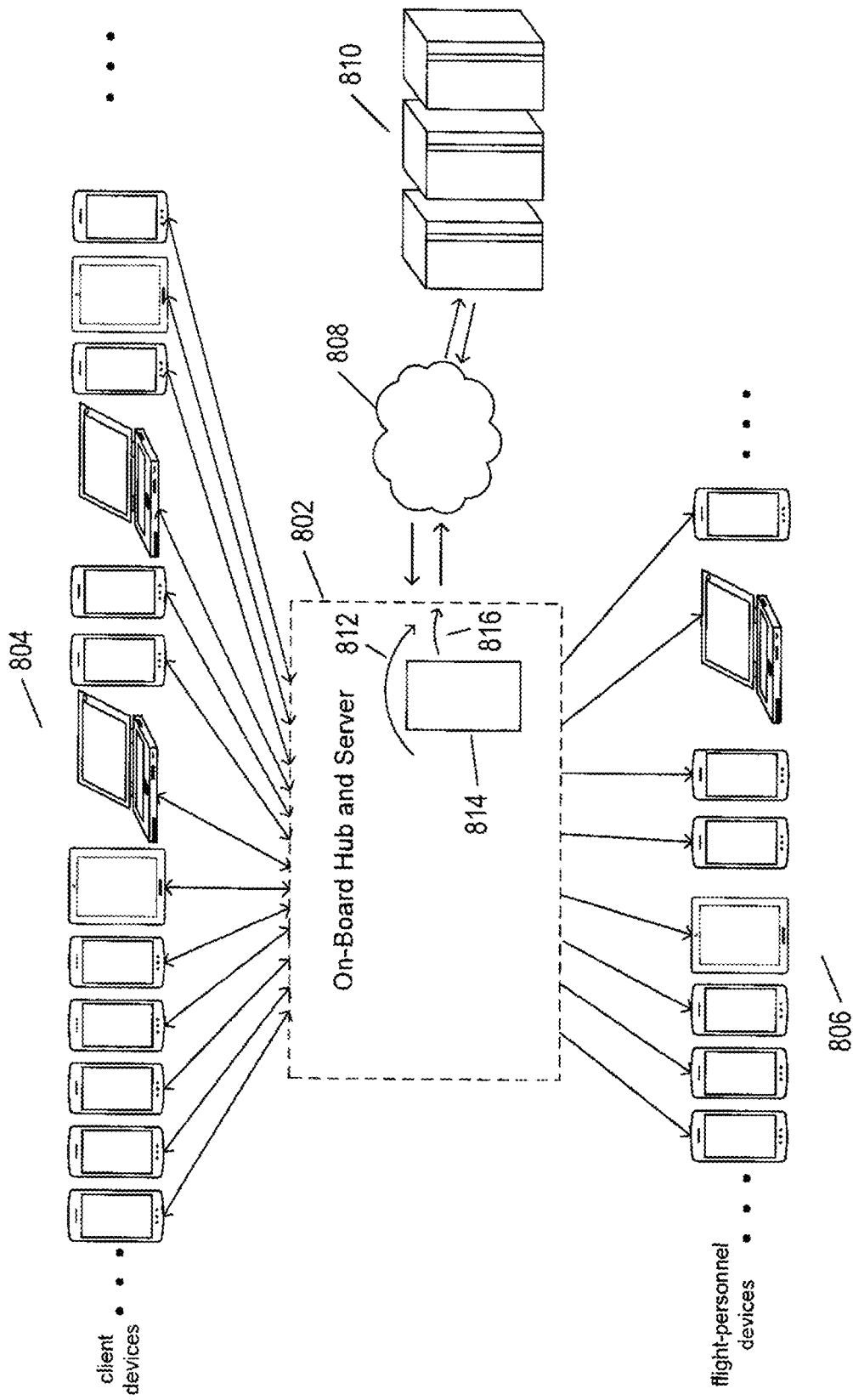
FIGS. 8A-C illustrate features of the STS architecture.
Figure 8B:
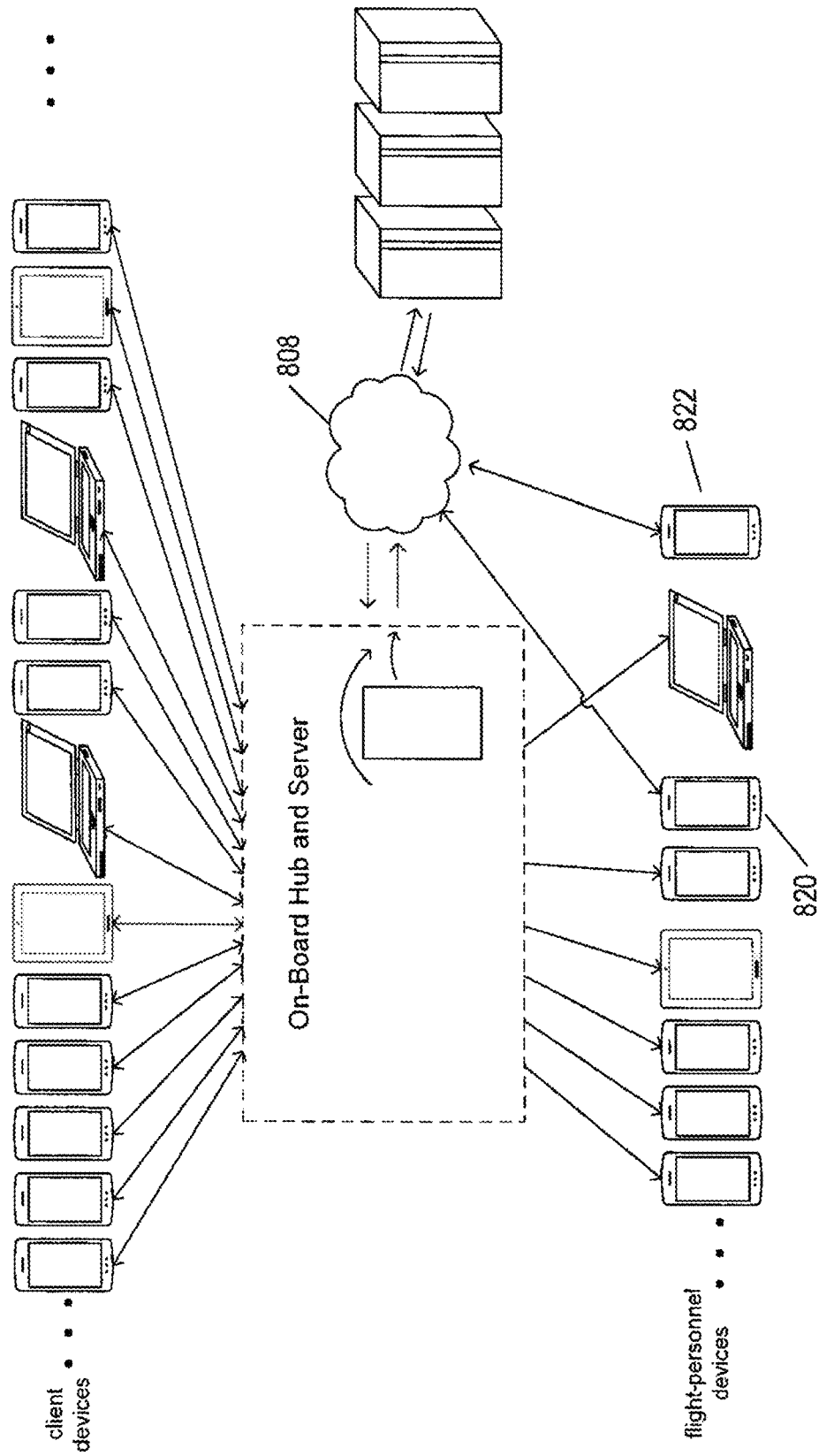
Figure 8C:
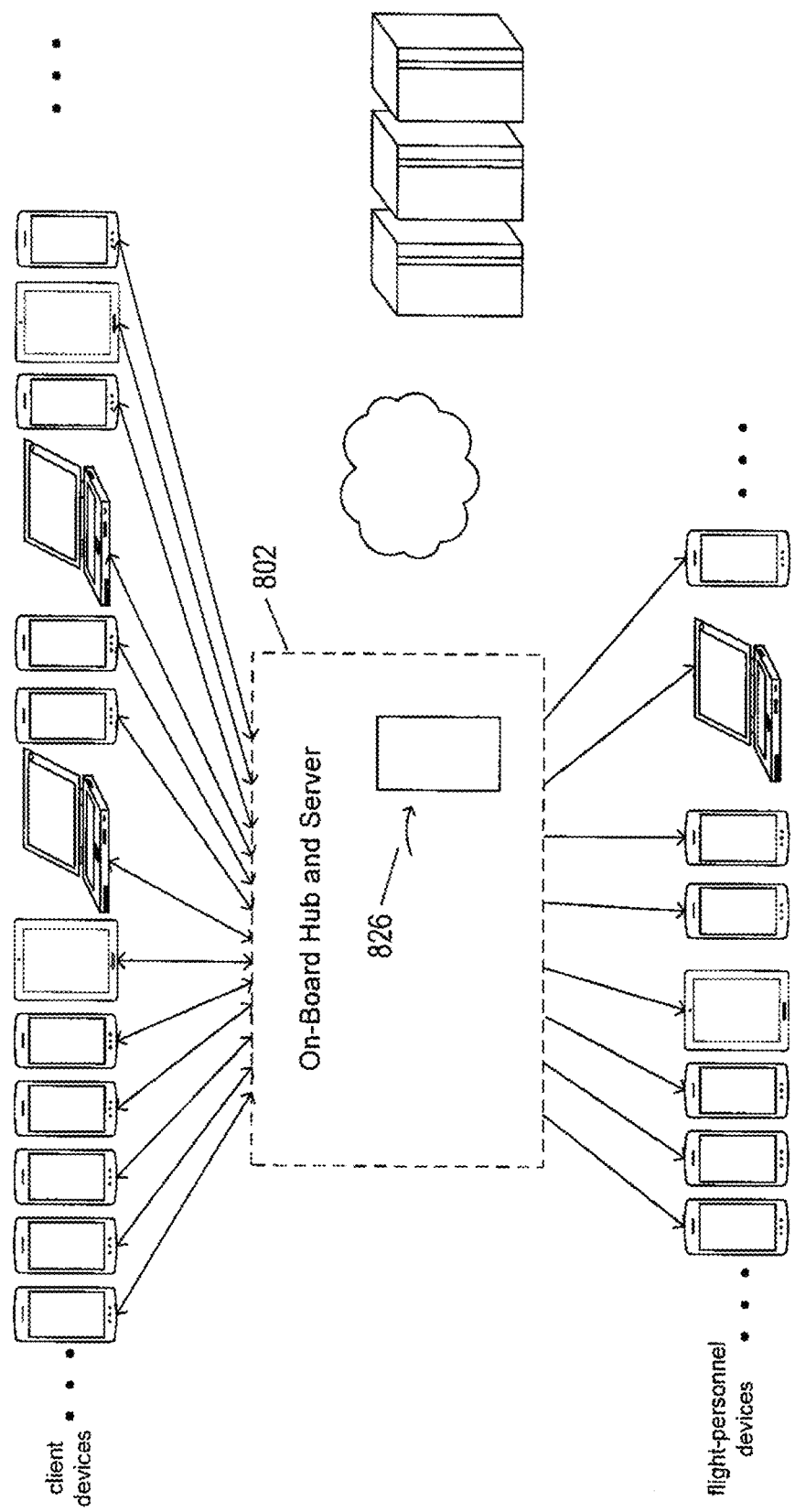

FIGS. 8A-C illustrate features of the STS architecture. As shown in FIG. 8A, the on-board hub-and-server component 802 of the STS communicates with many different passenger, or client, devices of different types 804 and with many different transportation-personnel devices of different types 806 via a radio-frequency-communications network within a commercial aircraft. In addition, when possible, the on-board hub-and-server component 802 communicates through broadband communications 808 with a distributed STS backend application executing within one or more remote cloud-computing-facility data centers 810. When communications with the STS backend application within one or more cloud-computing facilities are possible, various types of information requests and responses are directly communicated to the distributed STS backend application running within the one or more remote cloud-computing facilities, as indicated by curved arrow 812. In addition, various types of stored information requests and responses 814 may be communicated to the remote STS backend application, as indicated by arrow 816, following reestablishment of communications with the remote cloud-computing facility. In other words, when communications with the remote cloud-computing facility are not possible, such as during flight, in many commercial aircraft, the on-board hub-and-server component operates as a local, independent extension of the STS backend application, using a local database that has been synchronized with the distributed database in the remote cloud-computing facility prior to interruption of communications with the remote cloud-computing facility and buffering various types of requests and information uploads locally for eventual propagation to the remote cloud-computing facility when communications are restored. As shown in FIG. 8B, in certain implementations, transportation-personnel devices 820 and 822 can directly communicate with the STS backend application in the remote cloud-computing facility via broadband communications 808. For example, prior to departure, when the aircraft is still at the boarding gate, certain STS implementations allow transaction processing to be carried out directly between transportation-personnel devices and the remote cloud-computing facility. As shown in FIG. 8C, and as discussed above, when communications between the on-board hub-and-server component 802 and the remote cloud-computing facility are not possible, communications from the on-board hub-and-server component to the STS backend application are buffered locally by the on-board hub-and-server component, as indicated by arrow 826. Thus, transactions may be carried out locally, on behalf of passengers, and propagated to the remote cloud-computing facility when the flight has reached its destination and communications are re-established between the on-board hub-and-server component and the remote cloud-computing facility.

Figure 9A:
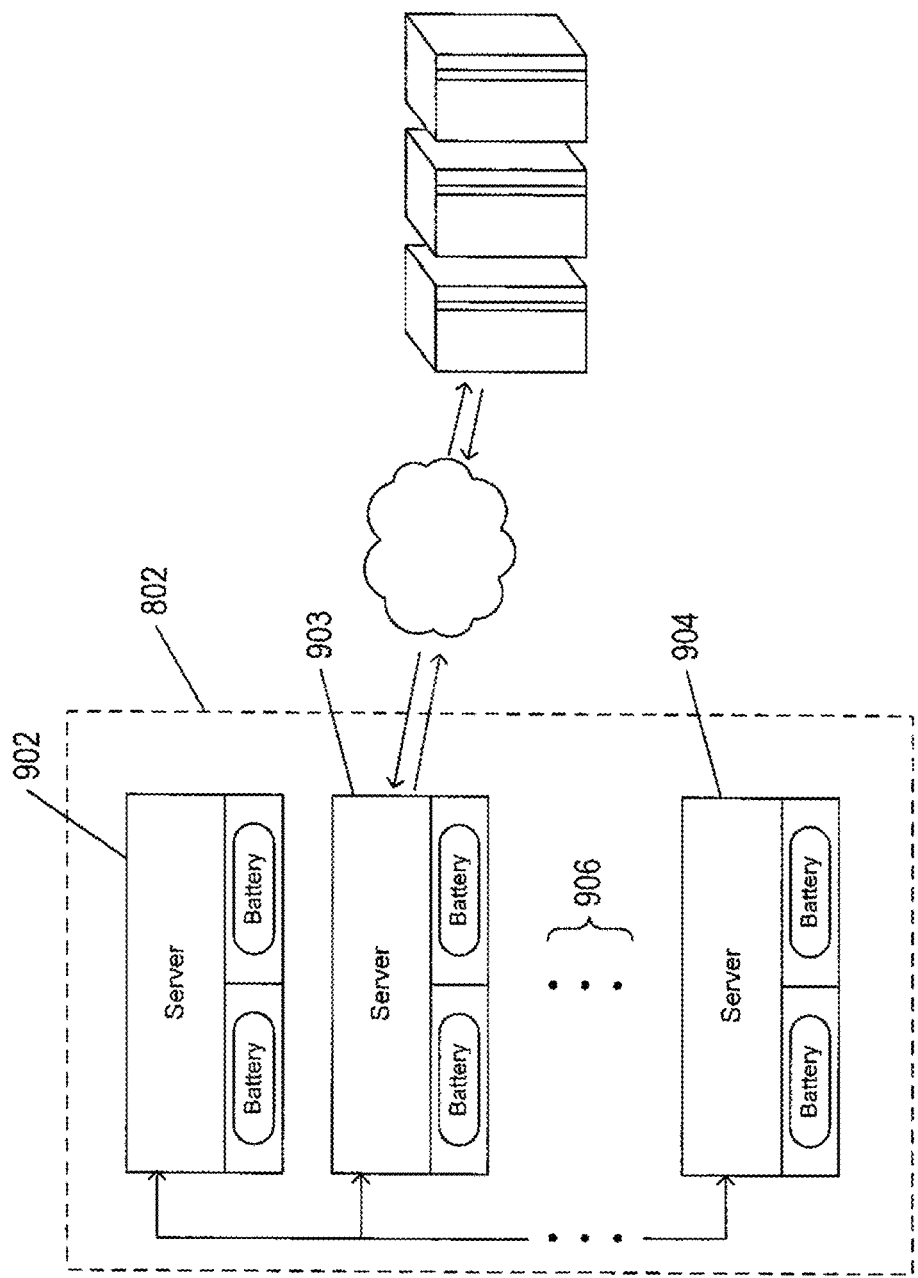
FIGS. 9A-B illustrate further architectural details with regard to the on-board hub-and-server component of the currently disclosed STS.
Figure 9B:
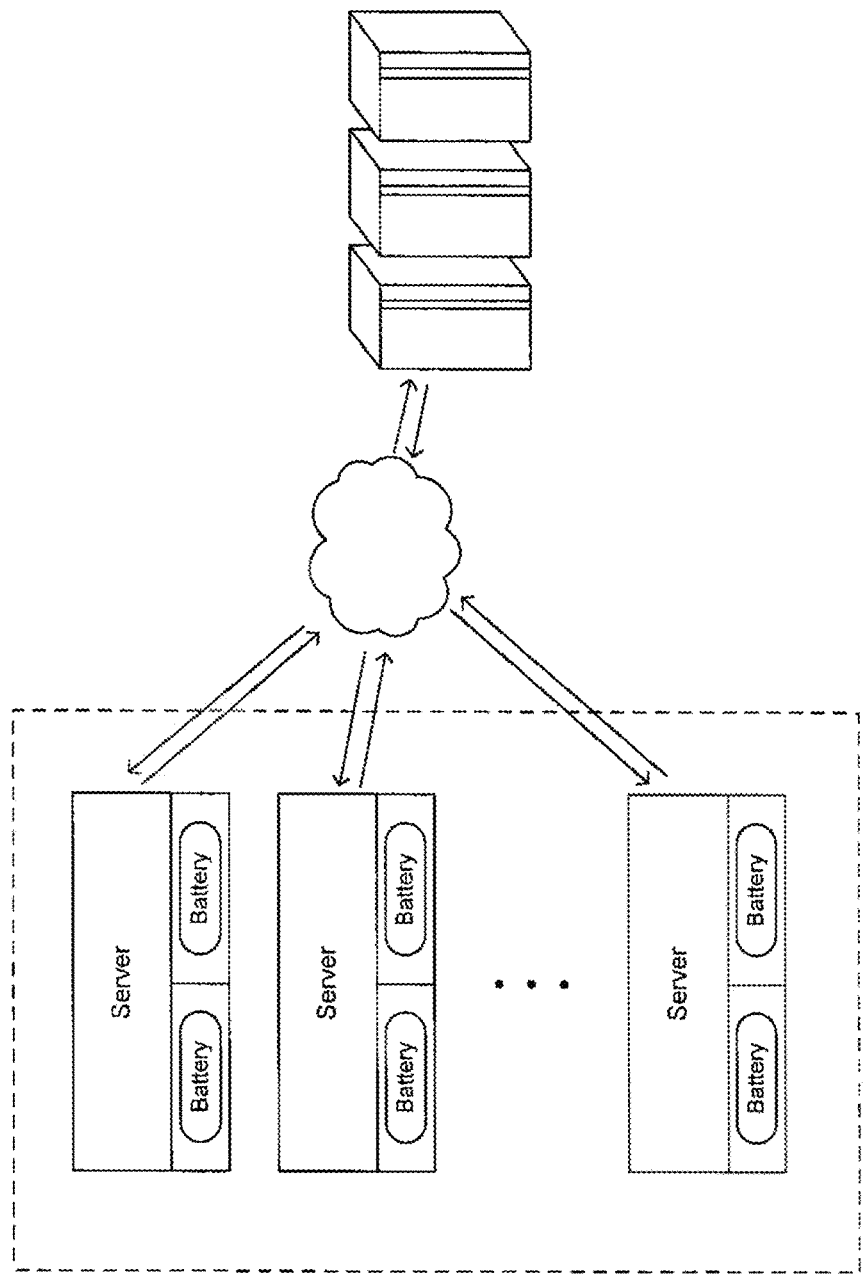

FIGS. 9A-B illustrate further architectural details with regard to the on-board hub-and-server component of the currently disclosed STS. As shown in FIG. 9A, the on-board hub-and-server component 802 may include multiple hub-and-server systems 902-904, where ellipsis 906 indicates that additional hub-and-server systems not shown in FIG. 9A may be included. Each of the hub-and-server systems, depending on the implementation, may communicate with different subsets of passengers and transportation personnel. In certain implementations, as transportation personnel and passengers move within an aircraft or another type of transportation vehicle, the passenger devices and transportation-personnel devices may directly communicate with the nearest hub-and-server system, or, alternatively with the hub-and-server system which provides the strongest radio-frequency signal. In certain implementations, as shown in FIG. 9A, a selected hub-and-server system 903 may communicate with the remote cloud-computing facility on behalf of the on-board hub-and-server component 802, with the other hub-and-server systems 902 and 904 communicating with the remote cloud-computing facility indirectly through the selected hub-and-server system 903. In alternative implementations, as shown in FIG. 9B, all of the hub-and-server systems that together comprise the on-board hub-and-server component 802 may communicate directly with the remote cloud-computing facility, when communications with the remote cloud-computing facility are possible. When multiple hub-and-server systems are used to implement the on-board hub-and-server component 802, not only can the communications overheads be shared among the multiple hub-and-server systems, the multiple hub-and-server systems can additionally provide for high-availability, so that, should an individual hub-and-server system fail or exhaust its power supply, the remaining hub-and-server systems can carry on providing services and transactions to those devices that were being handled by the failed or powered-down hub-and-server system. As shown in FIGS. 9A-B, each hub-and-server system includes multiple batteries so that the operational lifetime of the hub-and-server systems spans multiple individual battery lifetimes. Thus, a multi-hub-and-server implementations of the on-board hub-and-server component provides for multiple levels of failover, including power-supply failover, failover of service from a powered-down or improperly operating on-board hub-and-server system, and failover of individual communications connections between passenger and transportation-personnel devices and the on-board hub-and-server.

Figure 10A:
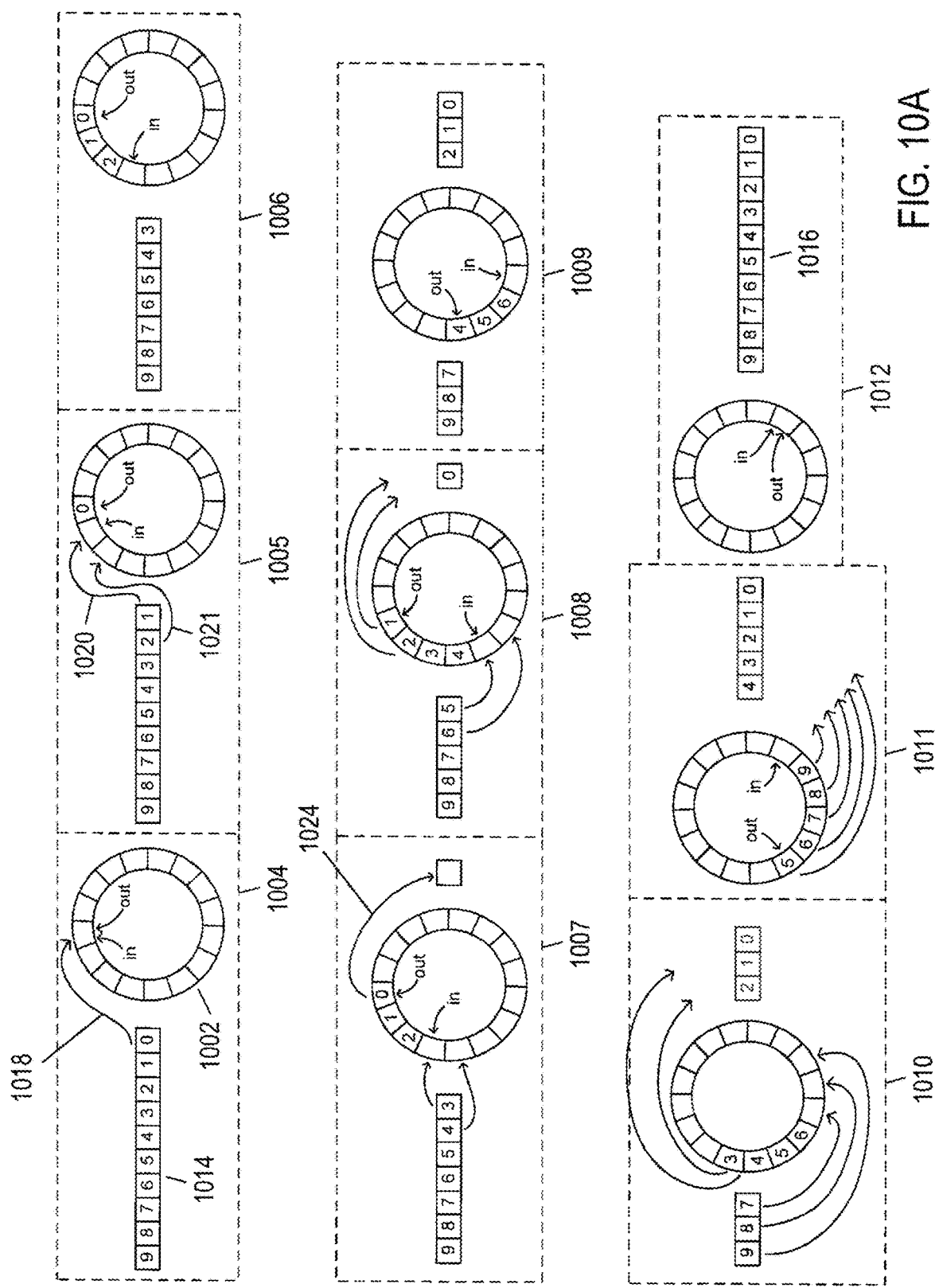
FIGS. 10A-B illustrates buffering between asynchronous entities.
Figure 10B:
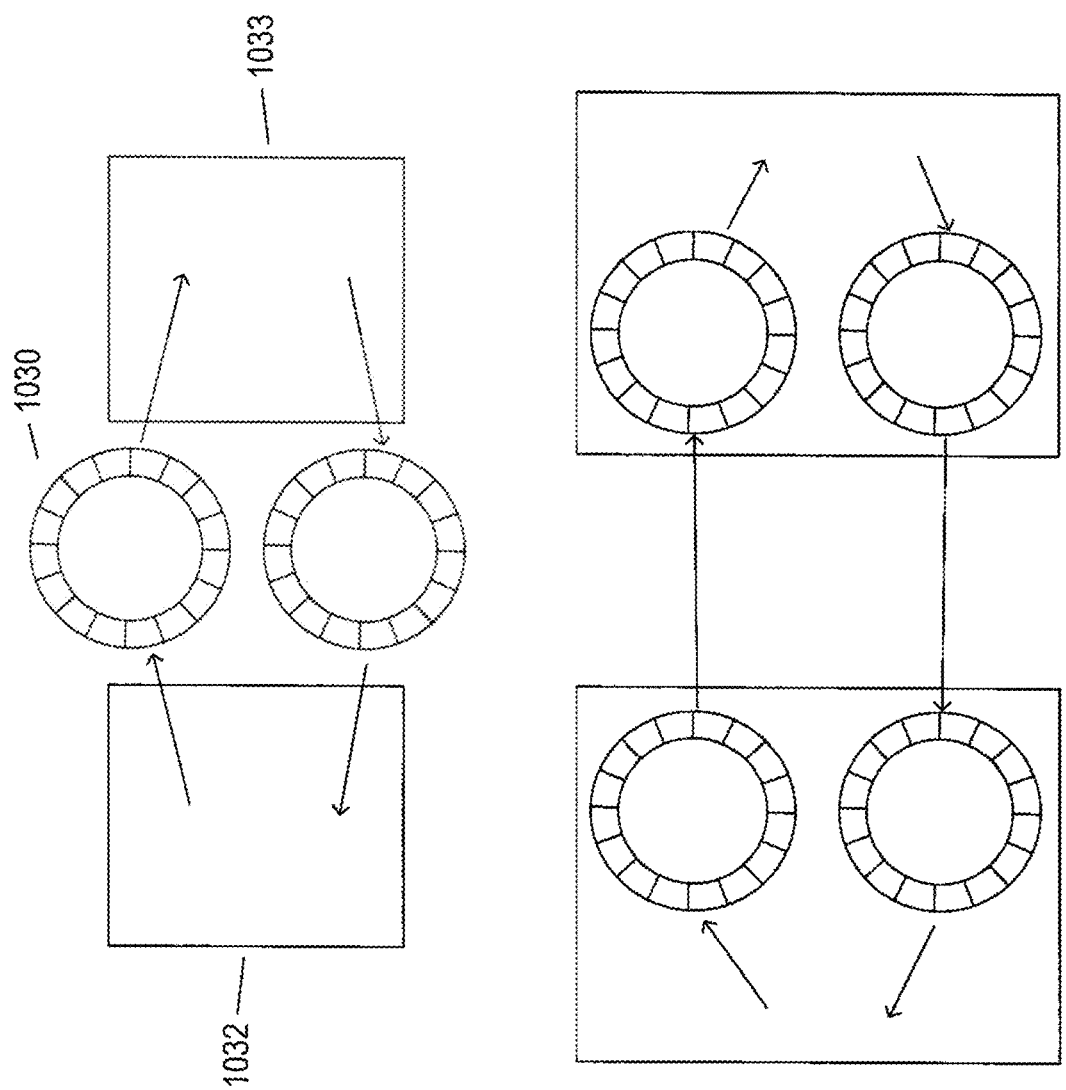

FIGS. 10A-B illustrates buffering between asynchronous entities. In the example shown in FIG. 10B, circular buffers are used. FIG. 10A illustrates operation of a circular buffer. A circular buffer 1002, or circular queue, is commonly illustrated as a circular data structure containing storage entities and having an in pointer and an out pointer. The in pointer points to the entry in which a next input should be added and the out pointer points to the entry from which information should be removed for output from the circular buffer, or circular queue. When the circular queue is empty, the in pointer and the out pointer both point to the same entry, as shown in the representation of the circular queue 1002 in FIG. 10A. FIG. 10A illustrates a sequence of states 1004-1012 of the circular queue as a first computational entity transmits 10 single-digit numerical values 1014 to a second computational entity. When all 10 single-digit numerical values have been successfully transmitted, they are shown to the right of the circular queue 1016 in state 1012. In the initial state 1004, the 10 single-digit numerical values 1014 are shown to the left of the circular queue. In a first operation, indicated by curved arrow 1018, the first computational entity inputs the numerical value 0 to the entry in the circular queue referenced by the in pointer. As a result, the circular queue transitions to the state 1005 with the numerical value 0 stored in the circular queue and the in pointer advanced to a next entry. The first computational entity next adds two more numerical values to the circular queue, as indicated by curved arrows 1020-1021. Completion of these operations results in state 1006, in which the three numerical values 0, 1, and 2 are stored in the circular queue and the in pointer has advanced to the entry following the entry containing numerical value 2. Next, the first computational entity adds two more numerical values to the circular queue, represented by curved arrows 1022-1023, and the second computational entity extracts a value from the circular queue, represented by curved arrow 1024, as shown in state 1007. This results in a transition to state 1008, with the second computational entity having obtained the numerical value 0 (1026) and the circular queue containing numerical values 1, 2, 3, and 4. Additional operations are indicated by additional curved arrows, in states 1008-1011, which ultimately results in transfer of all 10 numerical values to the second computational entity, as shown in state 1012. The circular queues are, of course, implemented in traditional sequential buffers by arithmetic operations carried out on the in pointer and out pointer. Circular queues provide temporary buffering to allow for asynchronous input and output operations carried out by two independently operating computational entities, generally allowing for unblocked operations provided that the rates of input to, and output from, the circular queue are not too dissimilar. As shown in FIG. 10B, two circular queues can be used for bidirectional information transfer between two computational entities. In one scenario, shown at the top of FIG. 10B, the two circular queues 1030-1031 are contained in a memory shared by the two computational entities 1032-1033, with information transmitted from the first computational entity 1032 to the second computational entity 1033 via the first circular queue 1030 and information transferred from the second computational entity 1033 to the first computational entity 1032 through the second circular queue 1031. In an alternative scenario, shown in the lower portion of FIG. 10B, each computational entity is associated with two local circular queues. There are many different types of methods and data structures that are used to implement asynchronous communications, but, in general, there is some kind of buffering uses to both spatially and temporarily buffer the information exchanged between independently operating computational entities.

Figure 11:
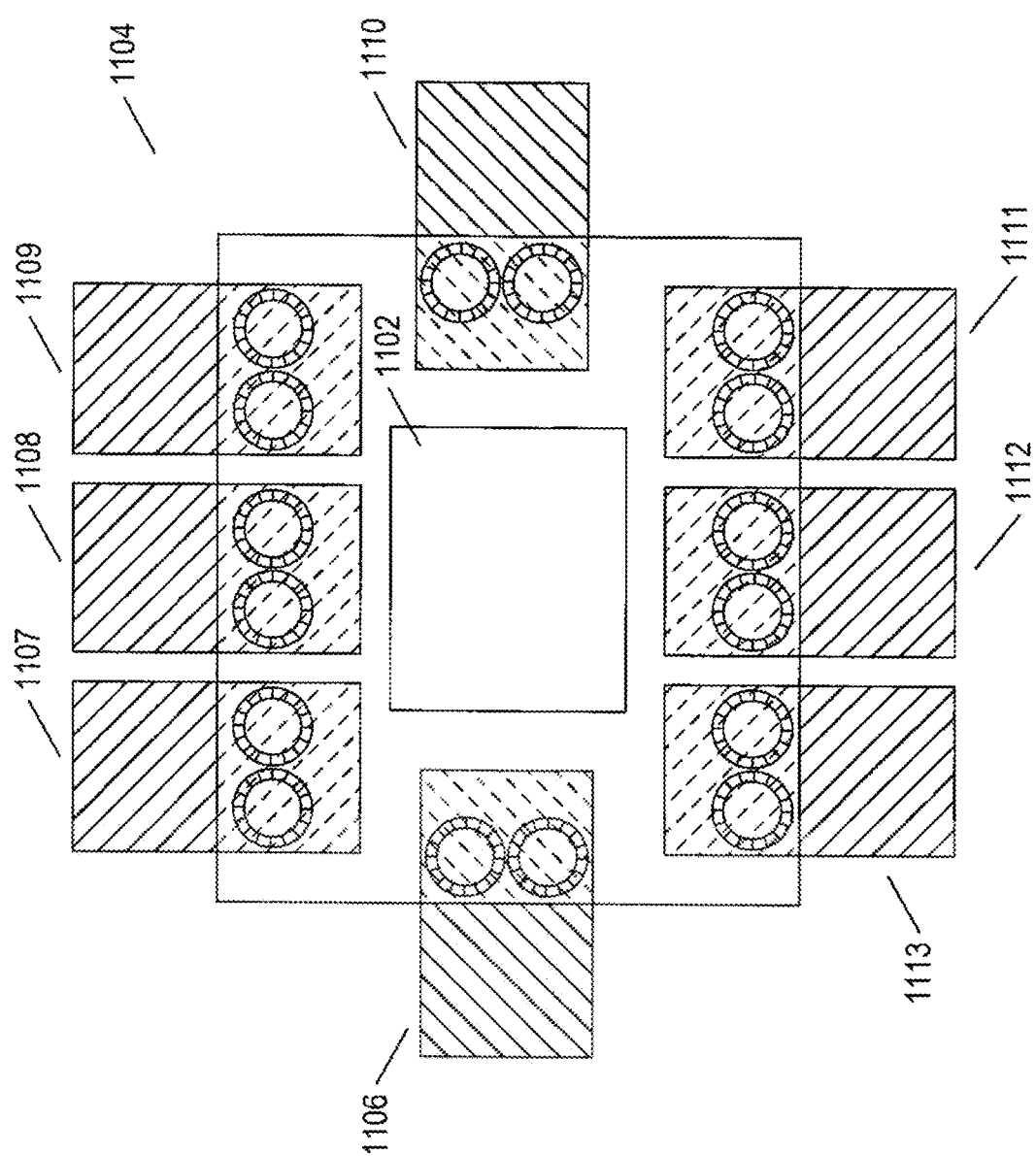
FIG. 11 illustrates another conceptual view of an operating system, different from the view provided in FIG. 4.

FIG. 11 illustrates another conceptual view of an operating system, different from the view provided in FIG. 4. This view is based on bidirectional, asynchronous communications, as discussed above with reference to FIGS. 10A-B. Circular-queues are used as a paradigm for bidirectional communications between asynchronous entities in FIG. 11. The operating system 1102 within a processor-controlled device 1104 is, essentially, an asynchronous-communications controller that manages asynchronous communications between multiple different entities 1106-1113 that together comprise the processor-controlled device. These entities include one or more processors, one or more memories, peripheral-device controllers, buses and serial links, and all of the other discrete components of the device. The operations carried out or facilitated by the operating system can be viewed as asynchronous data transfer between two or more discrete components of the device. Of course, the operating system itself is implemented by instructions moved from a mass-storage peripheral to memory and from memory to the one or more processors for execution by the one or more processors.

Figure 12:
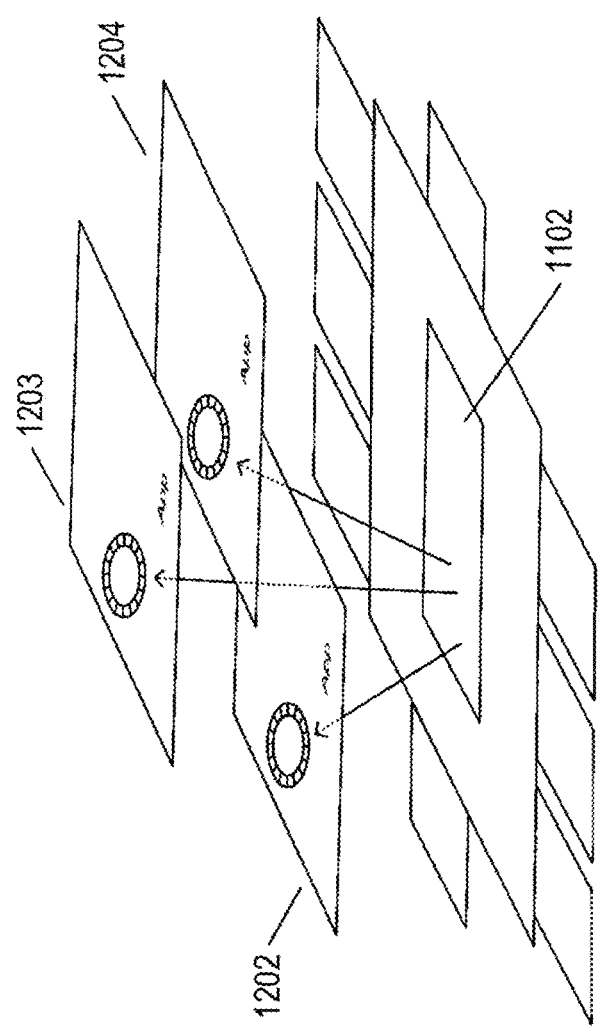
FIG. 12 illustrates application programs in the conceptual view introduced in FIG. 11.

FIG. 12 illustrates application programs in the conceptual view introduced in FIG. 11. Application programs 1202-1204 are also implemented, like the operating system, by instructions moved from a mass-storage peripheral to memory and from memory to the one or more processors for execution. However, when thought of as discrete entities, the application programs can be viewed as executing in an execution environment provided by the operating system 1102, which communicates with, and controls, the application programs by asynchronous interrupts. In addition, the application programs call operating-system routines which carry out tasks on behalf of the application programs. Here again, the operating system can be viewed as the entity which manages various types of communications between discrete entities that make up the device, including the application programs executing within the device. At an even higher level, the components of a distributed computer system, such as the currently disclosed STS, can be viewed as a large number of asynchronously communicating entities of various hierarchical levels within the STS, extending all the way to the various human users of the STS. A complex system, such as the currently disclosed STS, can be viewed at various levels of abstraction as a system of communications between the entities at that level of abstraction. Of course, all of the different hierarchical levels involve communications between entities at those levels, and sometimes between levels, and the overall operational behavior of such complex systems involves enormous numbers of different concurrent bidirectional communications or conversations. For example, within a mass-storage device, the mass-storage-device controller communicates with various hardware components, controlling them to carry out various types of sequences that lead to storing, retrieving, and updating data. This can be viewed as many different conversations being concurrently carried out between the mass-storage-device controller and the various hardware components controlled by the mass-storage-device controller. At a next higher level of abstraction, the mass-storage-device controller carries out a conversation with the one or more processors in order to receive and store data from memory, transfer data to memory, and cam Out other such tasks orchestrated by the operating system. This higher-level conversation occurs simultaneously with the many lower-level conversations between the mass-storage-device controller and various hardware components within the mass-storage device. Ultimately, at the highest levels, the STS can be considered to mediate conversations between passengers, flight attendants, and a distributed database and local services provided by one or more hub-and-server components of the STS, with passengers requesting services from the hub-and-server components, distributed database, and flight attendants and receiving, in response, the requested services. The STS mediates all of these higher-level conversations while concurrently mediating millions of lower-level internal conversation to facilitate them.

Figure 13:
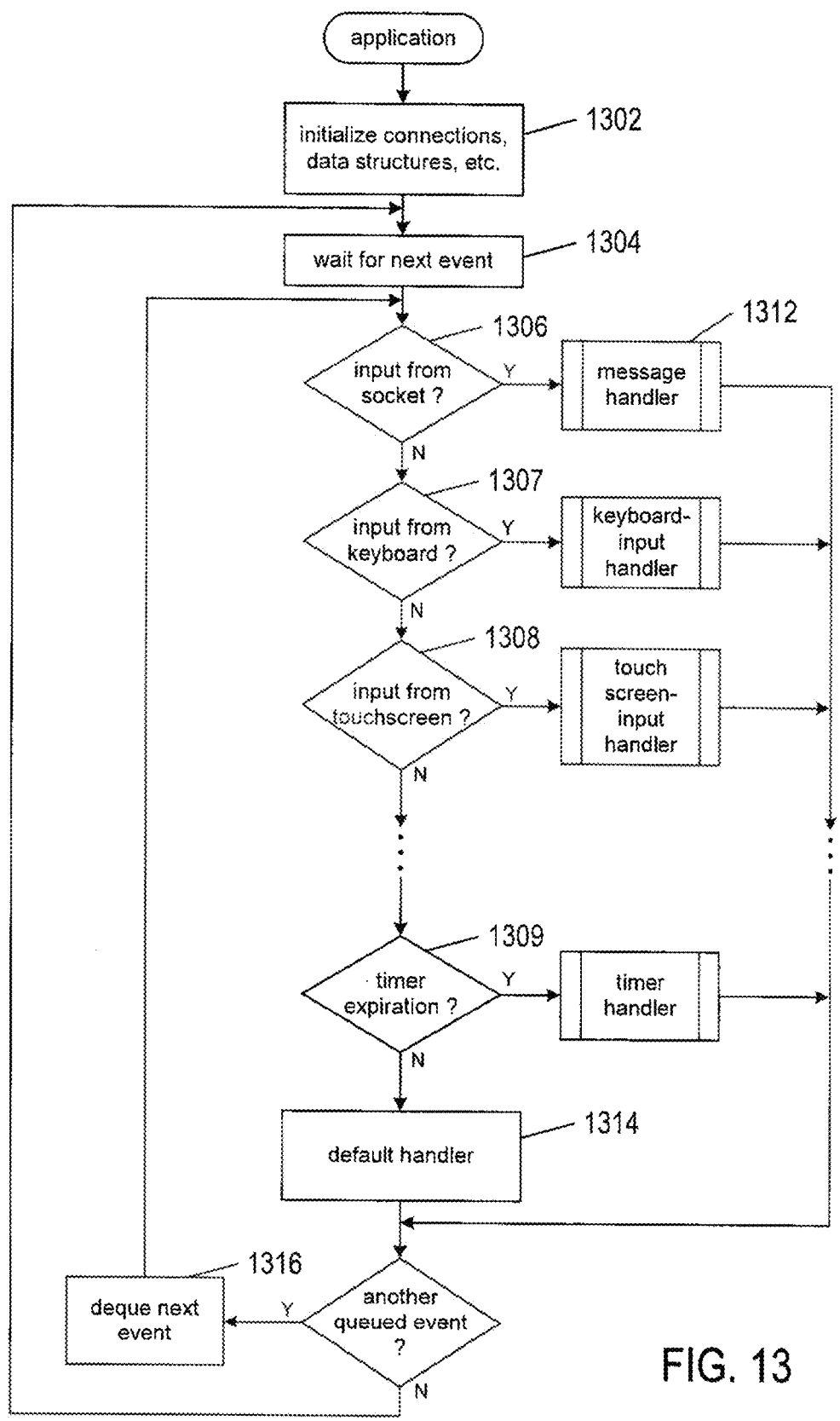
FIG. 13 illustrates a generalized event loop that underlies implementation of an application program.

FIG. 13 illustrates a generalized event loop that underlies implementation of an application program. In this view of an application program, the application program constitutes an event-handling event loop that continuously executes in order to respond to the various types of events that occur during application-program execution. Many of these events are ultimately generated by interrupts issued by the operating system or by asynchronous callbacks from the operating system. For example, when a passenger inputs a menu selection to a touch screen on the passenger's smart phone, the smart-phone operating system detects the menu-selection as an interrupt generated by the touchscreen and communicates the menu selection to a client application or web browser running within the passenger's smart phone as a software interrupt or callback. The application program processes the event and ultimately directs, via a system call, the touchscreen to acknowledge the menu selection by displaying graphical output to the user. A generalized event loop includes a first step 1302, in which the application is initialized after being launched on a computing device. Control then flows to step 1304, where the event loop waits for a next event to occur. What a next event occurs, a series of conditional steps 1306-1309 are used to identify which event or type of event has occurred. The conditional step that detects the event or type of event that has occurred invokes a handler for that event or event type, such as the message handler 1312 called when the next occurring event represents input to a communications socket, as determined in step 1306. A default handler 1314 is called for rare or unexpected events not detected by the series of conditional steps. Following handling of the most recently occurring event, control flows either back to step 1304, where the application waits for a next event to occur, or to step 1316, where the application dequeues another event that has occurred while processing the most recently handled event from an event queue.

Figure 14A:
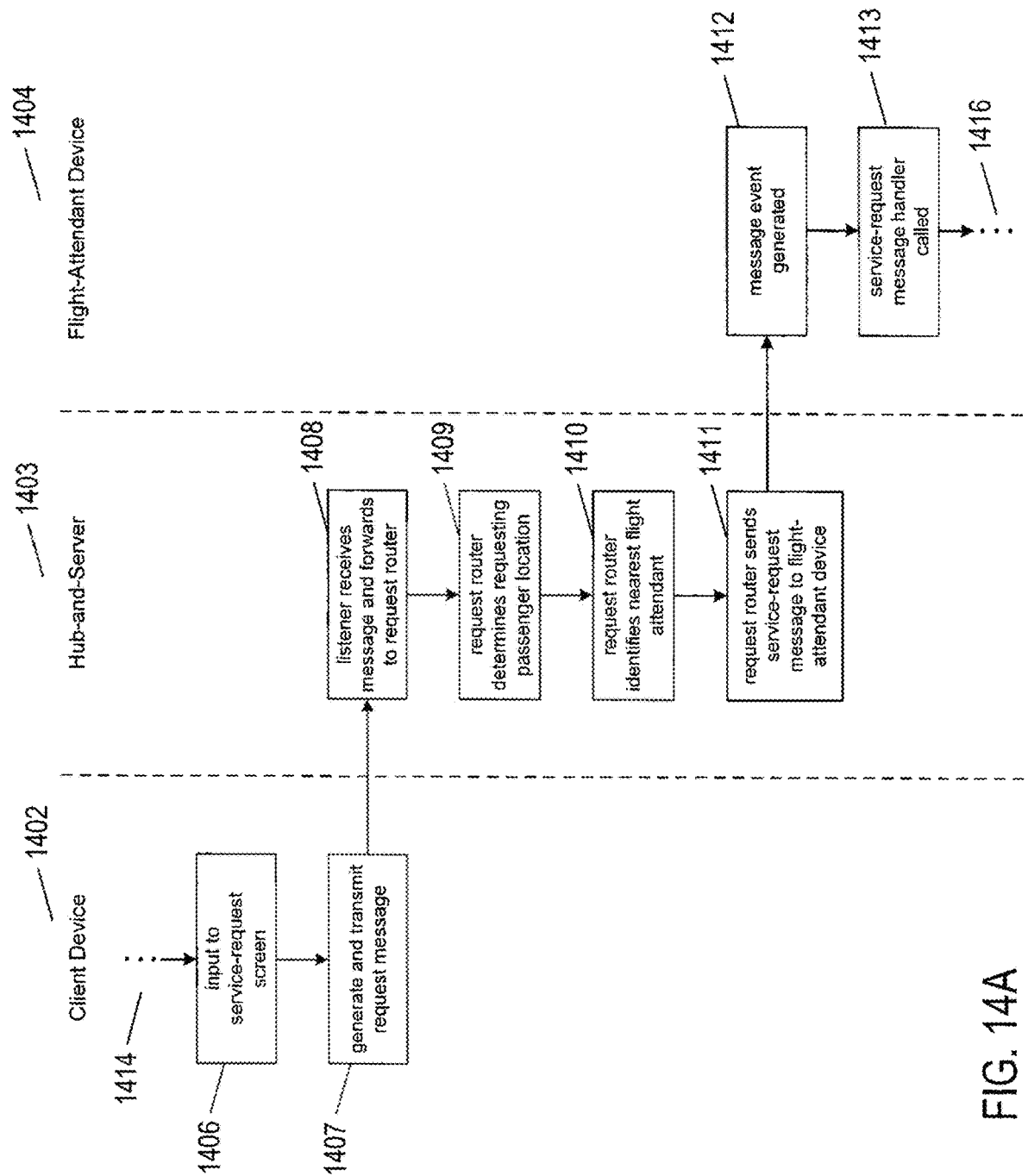
FIGS. 14A-B illustrates conversations between entities within the STS at several different levels of abstraction.
Figure 14B:
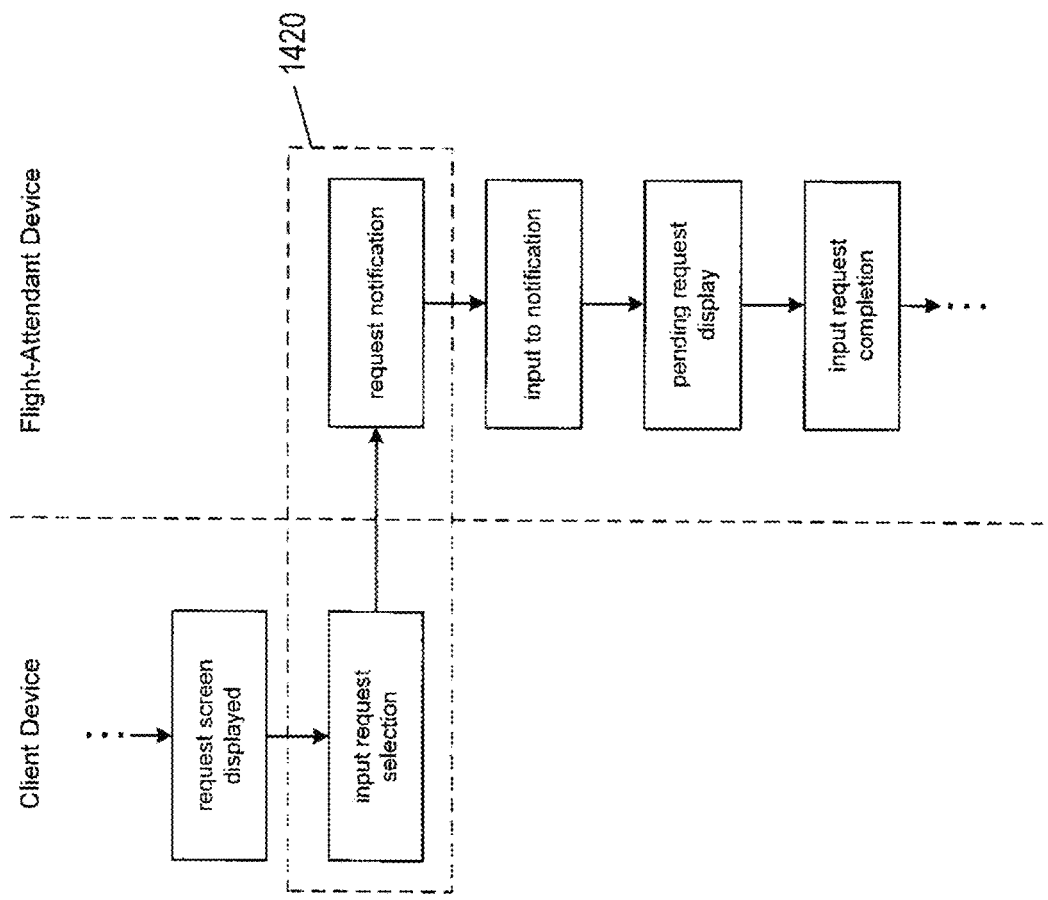

FIGS. 14A-B illustrates conversations between entities within the STS at several different levels of abstraction. FIG. 14A illustrates a multi-party conversation in which a client device, or passenger device, transmits a request to a flight-attendant device. The three columns 1402-1404 correspond to the client device, the hub-and-server component, and the flight-attendant device, respectively. In step 1406, the client device detects input, by a user, to a service-request screen displayed to the user by the client device. In step 1407, the client device generates and transmits a request message to the hub-and-server component. In step 1408, the hub-and-server component receives the message and forwards the request to a request router. In step 1409, the request router determines the location of the requesting passenger and, in step 1410, identifies the nearest flight attendant. In step 1411, the request router sends a service-request message to the identified flight-attendant device. In step 1412, the flight-attendant device receives the message and generates a corresponding event detected by the flight-attendant application. In step 1413, the event loop within the flight-attendant application calls a service-request message handler to process the received message. Ellipses 1414 and 1416 indicate that many steps precede and follow the initial and final steps shown in FIG. 14A. During the brief portion of the conversation between the client device and flight-attendant device shown in FIG. 14A, many additional lower-level conversations within the devices and the hub-and-server component are concurrently occurring to support the conversation between the client device and flight-attendant device. Of course, in various implementations of the STS, multiple flight-attendant devices may be notified of the request, in step 1411, so that multiple flight attendants can cooperate to service requests.

FIG. 14B illustrates a higher-level conversation between the client device and flight-attendant device. At this level, the hub-and-server component is not shown, since the higher-level conversation occurs between the client device and the flight-attendant device, without regard for the underlying transmission of messages between the two devices. At this conversational level, the portion of the lower-level conversation shown in FIG. 14A occurs in the two steps within the dashed rectangle 1420. At the conversational level shown in FIG. 14B, the steps are concerned with user inputs to corresponding applications running within user devices. For example, an entire, lower-level conversation occurs within the passenger's smart phone to detect a user input to the touch screen and generate a software interrupt to communicate the user input to the client application running within the smart phone.

Thus, a complex system, such as the currently disclosed STS, can be considered from many different viewpoints and conceptual levels. In one approach, discussed above, the system operation can be viewed at many different conceptual levels, at each of which many different conversations are carried out concurrently. It is this vast parallel operation of asynchronous entities at many different hierarchical levels that allows the STS to provide the flexibility and adaptability for providing new and evolving types of services and transactions that are not possible in conventional, hard-wired service-and-transaction systems. The computational bandwidth of the STS, including the computational bandwidths of the aggregate user devices, hub-and-server components, and cloud-computing facilities vastly exceeds the computational bandwidths of the most powerful supercomputers of the preceding generation of supercomputers. This enormous computational bandwidth not only supports large numbers of simultaneous streaming movies, chat exchanges, and other communications, but can also support new and emerging technologies that provide new types of STS-mediated services and interactions.

As an example of the many different types of conversation-based services and facilities provided by the STS, a seat-upgrade service is next described. This example is but one of thousands of different possible conversation-based services and facilities that can be incorporated into the STS.

Figure 15:
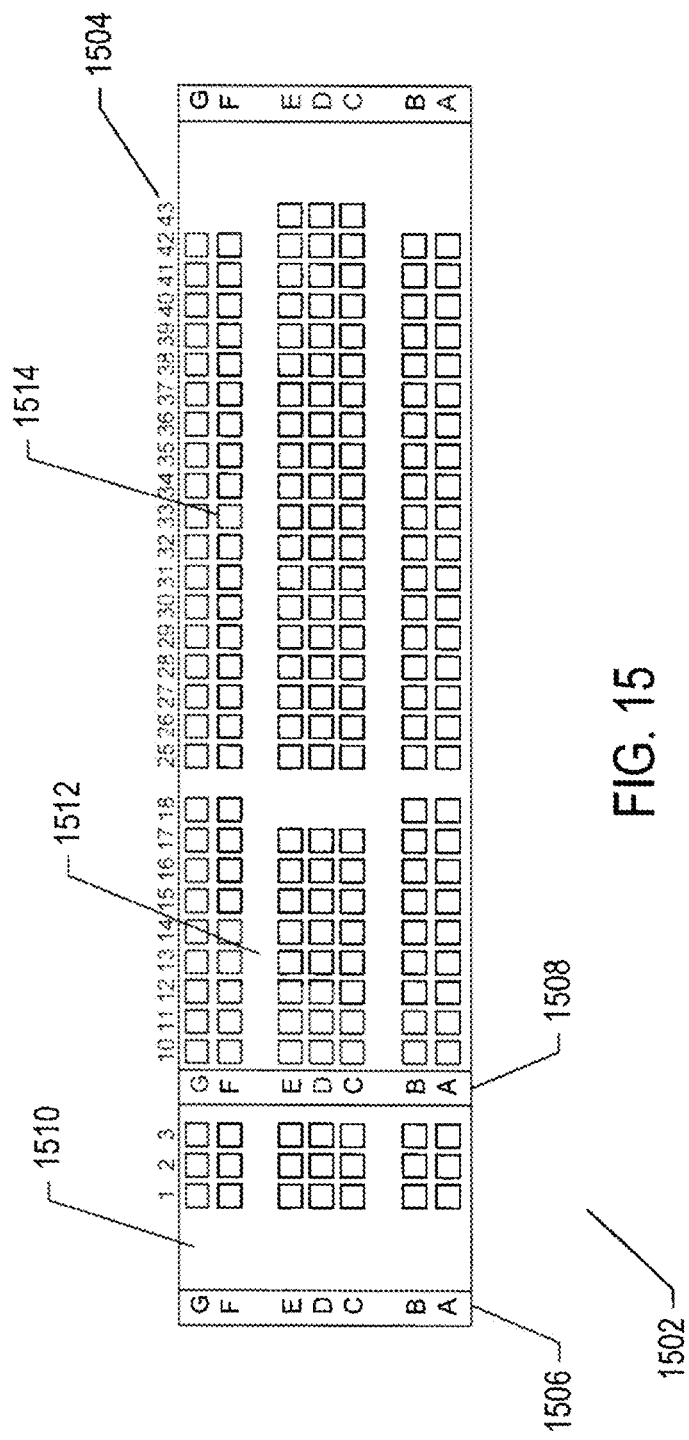
FIG. 15 shows a seating chart for an aircraft.

FIG. 15 shows a seating chart for an aircraft. The seating chart 1502 provides an abstract view of the relative locations of passenger seats within the aircraft. Each seat is uniquely identified by a row number and an aisle number. The rows are vertical and indexed by a horizontal row of row numbers 1504. The aisles are horizontal and indexed by a first vertical set of aisle numbers 1506 and a second vertical set of aisle numbers 1508. This aircraft includes a first-class section 1510, a business-class-action 1512, and an economy-class-action 1514. Each seat is also associated with a price, for a particular flight, as well as various types of constraints. For example, certain seats are located near exits and are constrained to be occupied by fully mobile passengers, to facilitate emergency deboarding. Seats may be associated with more complex constraints, such as a constraint that the seats in aisle A cannot be unoccupied when the seats in aisle F are fully or partially occupied, since such an asymmetrical arrangement of passengers might adversely affect the balance of the aircraft during flight.

It is often the case that, once passengers have been embarked and the doors securely closed, numerous seats within an aircraft remain unoccupied. The flight may not have been fully sold out, passengers may have been delayed in traffic, and passengers may have changed their minds at the last minute and decided not to embark. It has been the practice of many airlines to allow flight attendants to spontaneously reassign seats, at this point in time or later in the flight, when the seat-belt sign has been turned off once the aircraft has reached altitude. However, such informal seat reassignments may represent loss of revenue to the airline, may cause passengers not offered seat reassignments to feel slighted, and may unintentionally violate certain constraints with respect to seating arrangements. Currently, service-and-transaction systems provide no facilities for managing redistribution of unoccupied seats.

Figure 16A:
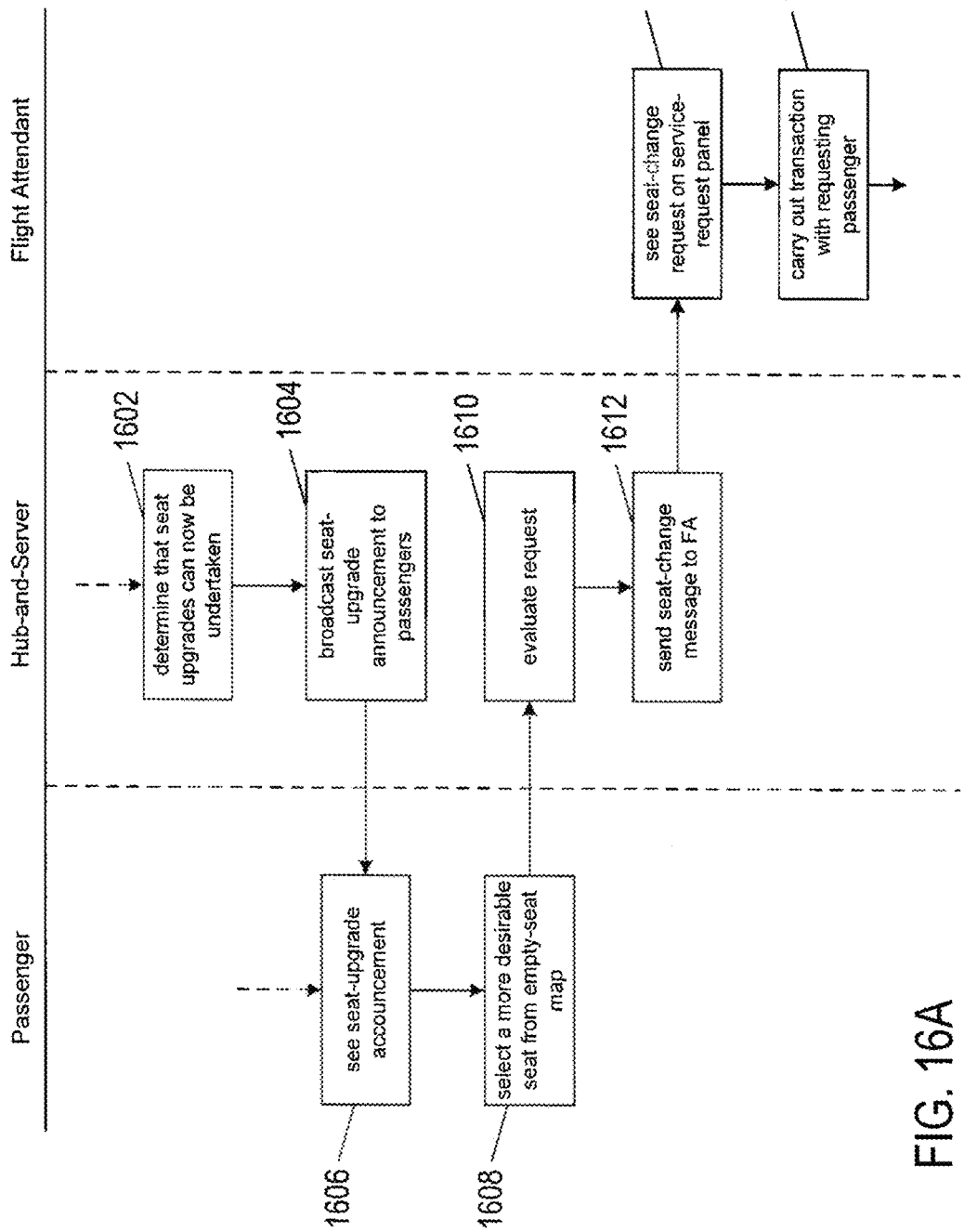
FIGS. 16A-B illustrates an example seat-reassignment conversation using illustration conventions used in FIG. 14A.
Figure 16B:
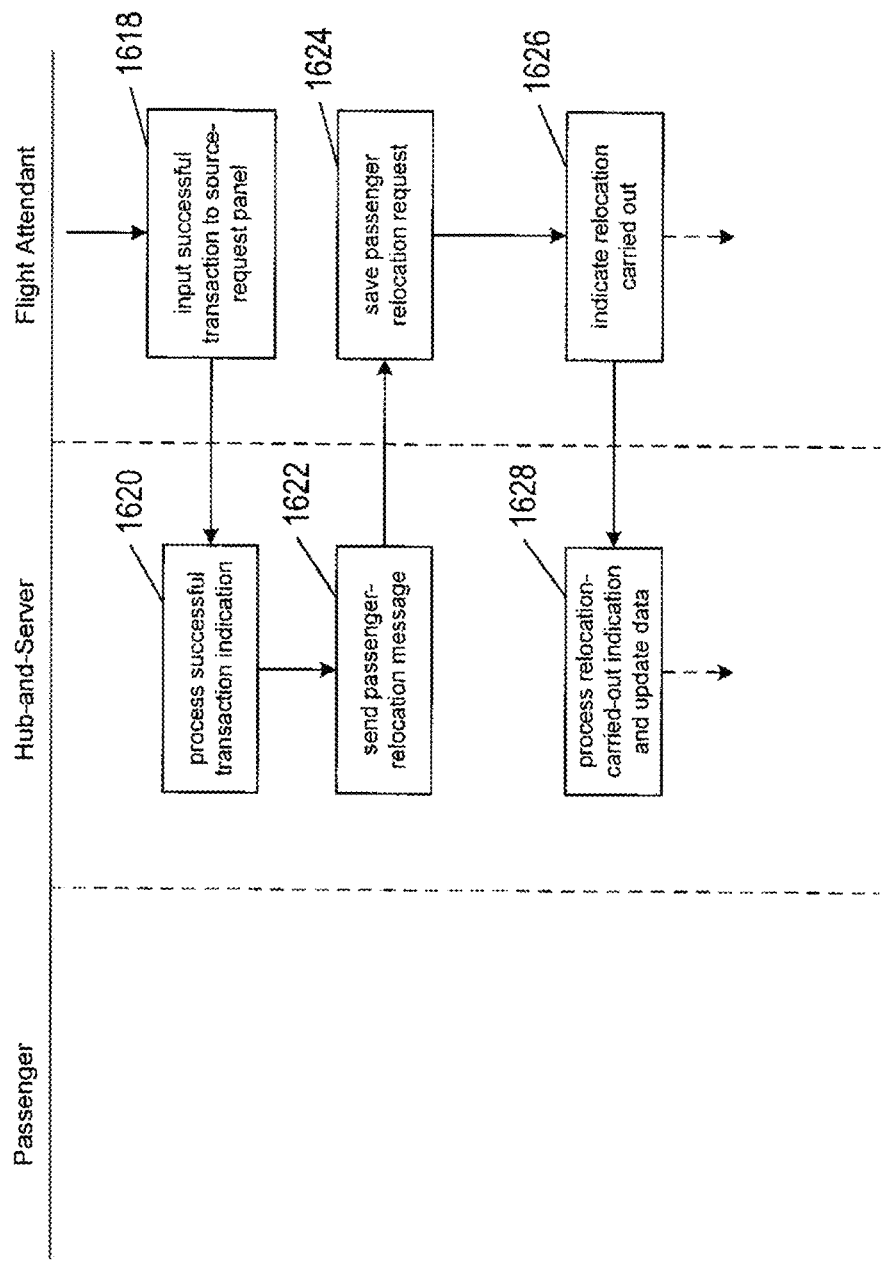

FIGS. 16A-B illustrates an example seat-reassignment conversation using illustration conventions used in FIG. 14A. In step 1602, the hub-and-the server component determines, as a result of crew and/or sensor input, that seat upgrades can now be offered to passengers. In step 1604, the hub-and-server component broadcasts a seat-upgrade announcement to the passenger devices. In step 1606, a passenger notices the seat-upgrade announcement and, generally through a series of interactions with the display screen, selects, in step 1608, a more desirable seat from a displayed seating map showing the empty seats and, in certain implementations, a graphical indication of the passenger's current seat. The request for a seat change is transmitted by the passenger's device to the hub-and-server component, which evaluates the request in step 1610. If the request can be satisfied, the hub-and-server components sends, in step 1612, a seat-change message to a flight attendant or to multiple flight attachments. In step 1614, the seat-change request is displayed in a service-request panel on a flight attendant's device, including a row and seat number for the passenger and, in some implementations, a graphical seating map with the passenger's seat highlighted or otherwise graphically marked. In step 1616, after navigating to the requesting passenger, the flight attendant carries out a transaction for the seat change in which the passenger pays any required upgrade fees. A separate transaction conversation occurs between the flight attendant's device and either the hub-and-server component or the cloud-computing facility. In the current discussion of the seat-upgrade facility, the financial transactions are not further described. Turning to FIG. 16B, the flight attendant inputs a successful-transaction indication to the flight attendant's device, in step 1618, which is transmitted back to the hub-and-server component. The hub-and-server component processes the successful transaction indication, in step 1620, and sends a passenger-relocation message, in step 1622, to the flight-attendant's device. In step 1624, the flight attendant notices the passenger-relocation request, makes his or her way to the requesting passenger, if the flight attendant had moved away after completing the transaction, and facilitates the seat change, after which the flight attendant inputs an indication that the relocation request has been completed, in step 1626. Input of the indication that the relocation request has been completed is transmitted back to the hub-and-server component 1628, which processes the message, updates an internal seat map and other data, and, when direct communications between the flight-attendant device and the remote cloud-computing facility are not possible, buffers the seat-change transaction for subsequent propagation to the remote cloud-computing facility.

This is but one example conversation of many hundreds of thousands of different types of conversations that may be carried out in order to effect passenger seat upgrades, depending on the STS implementation. For example, in certain systems, passengers may relocate independently of flight attendants once seat-change transactions have been successfully completed. As another example, discussed below, following an initial phase of seat upgrading, during which passengers request upgrades to specific seats selected by the passengers, an additional second auction phase and an additional third lottery phase may be conducted. During the auction phase, remaining unoccupied seats are auctioned off to passengers. This provides additional revenues for seats that would otherwise not generate revenue. During the lottery phase, passengers use various coupons or rewards that they have received for past purchases to buy lottery tickets for those seats that are unoccupied following the first two seat-upgrade phases. Again, because of the computational and communications bandwidths available to the STS, a wide variety of conversation-based implementations can be implemented, according to different parameters, considerations, and policies. In many cases, the particular approach can be dynamically adjusted to provide efficient seat upgrading in different types of circumstances, including different aircraft and passengers from different countries with different customs and preferences.

Figure 17:
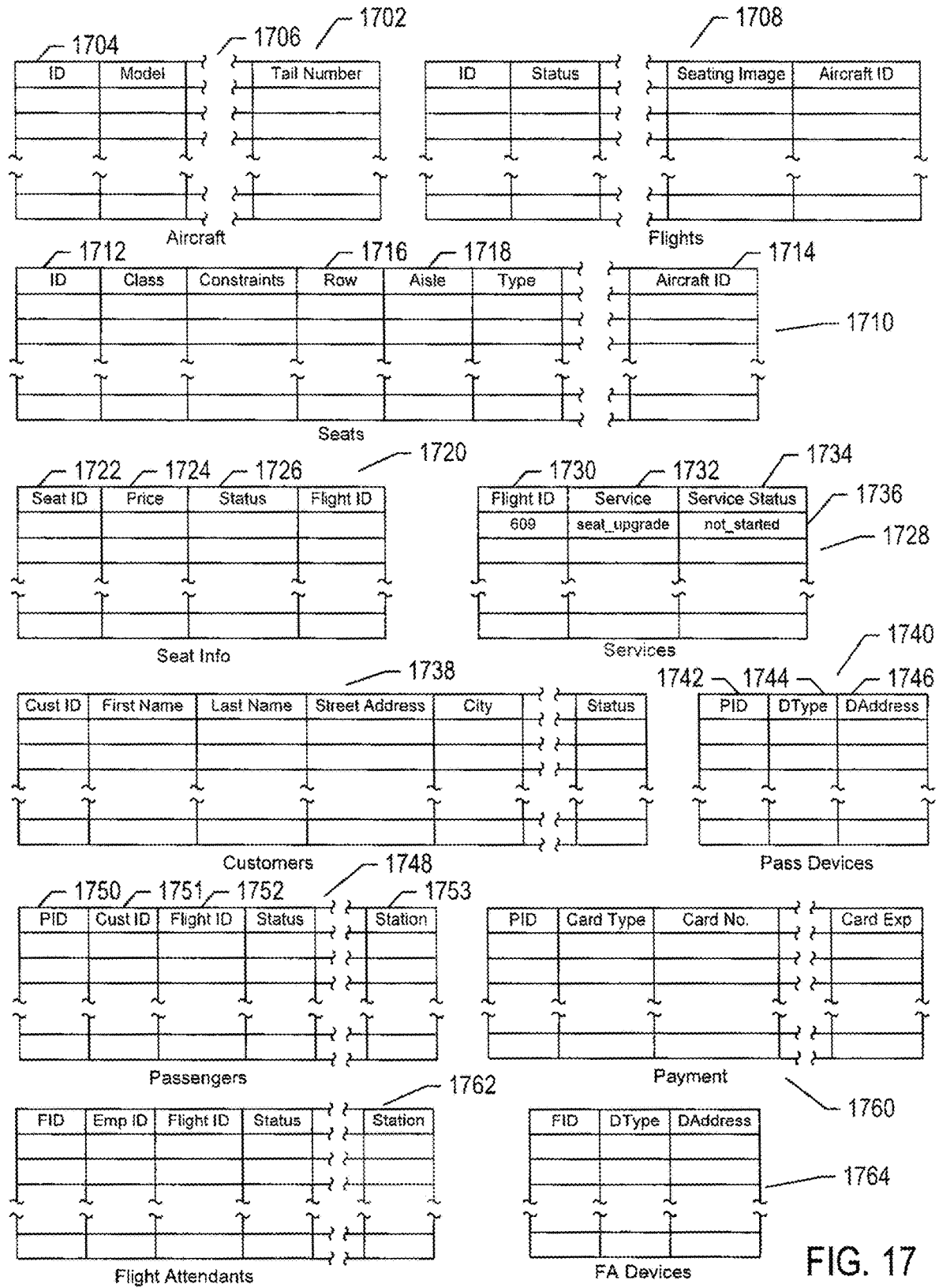
FIG. 17 illustrates numerous relational-database tables that may store data within the STS relevant to seat-upgrade operations as well as to many other types of operations carried out by the STS.

FIG. 17 illustrates numerous relational-database tables that may store data within the STS relevant to seat-upgrade operations as well as to many other types of operations carried out by the STS. The relational-database tables are generally stored by a distributed database running within the remote cloud-computing facility. However, relational database tables, or portions of relational database tables, may be locally stored within one or more hub-and-server components as a distributed extension of the database. In certain cases, the one or more hub-and-the server components may additionally store local tables relevant only to a particular aircraft and/or flight. Those tables representing local extensions of the database are synchronized with the cloud-computing-facility-resident database by distributed-database protocols. Only a brief description of the example tables shown in FIG. 17 is provided, since many of the columns, or fields, are not relevant to the seat-upgrade facility and since the exact data types involved may differ in different implementations.

Each row of the Aircraft table 1702 is essentially a record describing a particular aircraft used by an airline. As with the remaining tables, the first column, or field, ID 1704, is a unique identifier for the entity described by each row in the table. In the current case, the ID is an identifier for a particular aircraft. The other columns, or fields, represent different additional types of information, such as the model number of the aircraft and the tail number of the aircraft. Each table includes a broken column, such as broken column 1706, which indicated many additional columns may be present in the table. Each row of the Flights table 1708 represents a different flight provided by the airline. Each row of the Seats table 1710 represents a different seat on a particular aircraft. The seat is identified by an identifier in the first field, or column, 1712 and the aircraft containing the seat is identified by an identifier in the final field, or column 1714. Each seat is associated with a row number 1716 and an aisle number 1718. In alternative implementations, each seat may be additionally associated with a current flight ID or may be associated with a current flight ID rather than an aircraft ID. Each row of the SeatInfo table 1720 includes flight-specific data for the seat identified by a seat identifier 1722, including a price 1724 and status 1726. In the example described below, the status of the seat may be "empty" or "occupied." Each row of the table Services 1728 represents a different service that may be provided by the STS for a particular flight identified by a flight identifier 1730. The service has an identifying name 1732 and a status 1734. For example, in the record represented by row 1736, the seat-upgrade service is identified by the name "seat_upgrade" and the initial status of the service is "unstarted." Each row of the Customers table 1738 represents an airline customer. Each row of the PassDevices table 1740 represents a passenger device, identified by an identifier for the passenger 1742, a device type 1744, and a device network address 1746. Each row of the Passenger table 1748 represents a passenger on the flight. The passenger is identified by a passenger identifier 1750, a customer identifier 1751, a flight identifier 1752, and a seat identifier 1753. Each row of the Payment table 1760 represents a payment instrument belonging to a particular passenger, such as a credit card. Each row of the FlightAttendants table 1762 represents a flight attendant. Each row of the FADevices table 1764 represents a flight-attendant device, similar to passenger devices represented by the PassDevices table 1740. The PassDevices table and the FADevices table are local database tables. The remaining tables shown in FIG. 17 represent local extensions of the distributed database maintained by the STS. As mentioned above, the tables that represent extensions of the local database are synchronized with the database maintained by the STS backend application within the remote cloud-computing facility or facilities when communications are possible, but act as asynchronous-communications buffers during periods when communications are not possible.

Figure 18A:
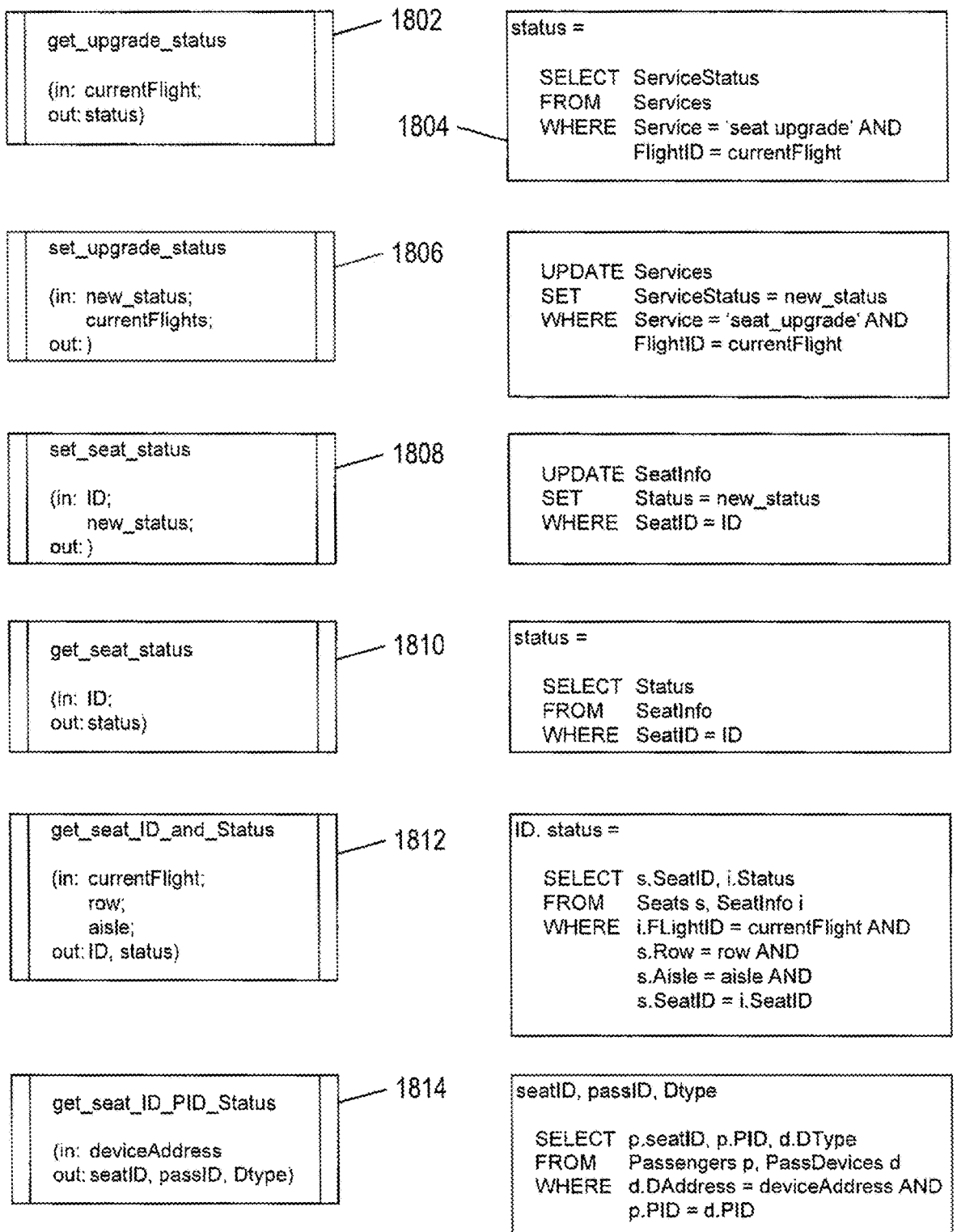

FIGS. 18A-B provide various simple routine declarations, used in subsequent control-flow diagrams, and corresponding structured query language ("SQL") implementations of the routines. The routine get_upgrade_status 1802 receives the identifier for a current flight, as input, and outputs the status of the seat-upgrade service (column 1734 in the Services table 1728). The SQL implementation is shown within rectangle 1804. The SQL implementations of all of the remaining routines in FIGS. 18A-B are paired with the routine declarations, in similar fashion. The routine set_upgrade_status 1806 sets the status field for the seat_upgrade service to a new value. The routine set_seat_status 1808 sets the status (column 1726 in the SeatInfo table 1720) for a seat identified by the argument ID to a new value. The routine get_seat_status 1810 returns the current status for a seat identified by the input argument ID. The routine get_seat_ID_and_status 1812 returns the identifier and status for a particular seat identified by an input flight identifier, row, and aisle. The routine get_seatID_PID_D-type 1814 returns the seat identifier, passenger identifier, and device type for a device with the input device address. The routine get_constraints 1816 returns the constraints associated with a seat identified by an input seat identifier. The routine set_seat 1818 sets the seat identifier for a passenger in the Passengers table. The routine get_passengers 1820 returns a set of passenger-identifier, seat-identifier, and device-address tuples for the passengers on a particular flight. The routine get_flight_attendant 1822 returns a set of flight-attendant-identifier/device-address tuples for a particular flight. The routine get_row_aisle_status 1824 returns a set of row/aisle/status/price/identifier tuples for a particular flight. The routine get_seat_map 1826 returns the seat map for a particular flight.

Figure 19:
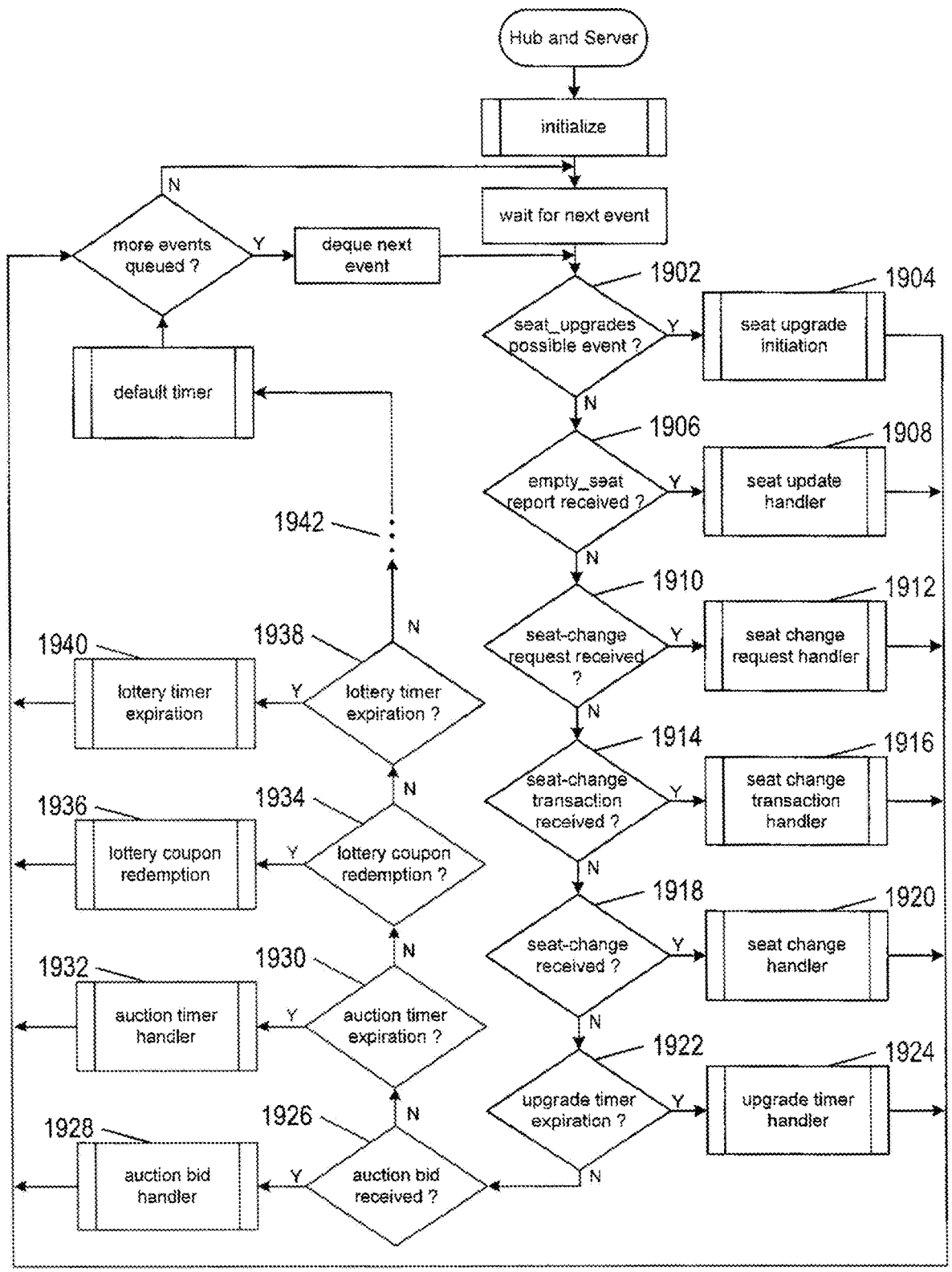
FIG. 19 provides a control-flow diagram for a portion of the event loop for the hub-and-server component of the STS that detects events associated with the seat-upgrade facility.

FIG. 19 provides a control-flow diagram for a portion of the event loop for the hub-and-server component of the STS that detects events associated with the seat-upgrade facility. This event loop has the form of the generalized event loop discussed above with reference to FIG. 13. This event loop detects a seat-upgrades-possible event, which indicates that seat upgrades can be undertaken, in conditional step 1902, and the routine "Seat upgrade initiation" 1904 is called in response to detection of this event. Empty-seat-report-received events are detected by conditional step 1906, which calls the "seat update" handler 1908. Seat-change-request-received events are detected by conditional step 1910, which calls the "seat change request" handler 1912. Seat-change-transaction-received events are detected by conditional step 1914, which calls the "seat change transaction" handler 1916. Seat-change-received events are detected by conditional step 1918, which calls the "seat change" handler 1920. Upgrade-timer-expiration events are detected by conditional step 1922, which calls the "upgrade timer" handler 1924. Auction-bid-received events are detected by conditional step 1926, which calls the "auction bid" handler 1928. Auction-timer-expiration events are detected by conditional step 1930, which calls the "auction timer" handler 1932. Lottery-coupon-redemption events are detected by conditional step 1934, which calls the routine "lottery coupon redemption" 1936. Lottery-time-expiration events are detected by conditional step 1938, which calls the routine "lottery timer expiration" 1940. Ellipsis 1942 indicates that many other types of events are detected and handled by the hub-and-server event loop. The meanings of these events are discussed below in the discussions of the control-flow diagrams for the routines and handlers called by the conditional steps which detect the events in the event loop. Of course, different implementations may use different events, numbers of events, and techniques for coordinating the different steps in the seat-upgrade process. For example, flight-attendant inputs can be used, instead of timers, to cause transitions between the phases.

Figure 20A:
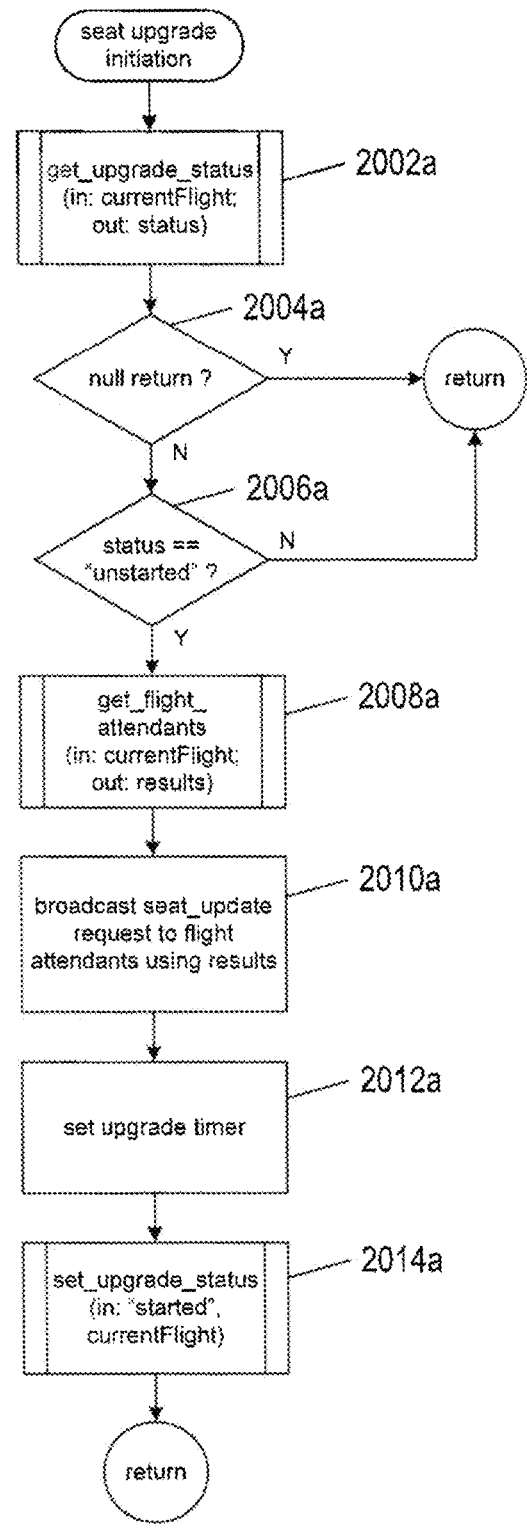
FIGS. 20A-L provide control-flow diagrams for the handlers and routines called from the hub-and-server event loop discussed with reference to FIG. 19.

FIGS. 20A-L provide control-flow diagrams for the handlers and routines called from the hub-and-server event loop discussed with reference to FIG. 19. It should be noted that certain low-level details are omitted, including low-level locking and commit operations to ensure that overlapping requests and transactions are serialized. FIG. 20A shows a control-flow diagram for the routine "seat upgrade initialization," called in step 1904 of FIG. 19. In step 2002a, the routine get_upgrade_status is called to determine the current status for the seat-upgrade service. If a null value is returned, as determined in step 2004a, the routine "seat upgrade initialization" terminates, since the absence of an entry in the Services table indicates that seat-upgrade service is not available on the current flight. If the status is not equal to "unstarted," as determined in step 2006a, the routine "seat upgrade initialization" terminates, since only a single initialization of the upgrade-status facility is permitted, in the described implementation. In step 2008a, the routine get_flight_attendants is called to get a set of tuples representing the flight attendants. In step 2010a, a seat-upgrade-request message is broadcast to the flight attendants. In step 2012a, an upgrade timer is set to expire after a sufficient period of time for flight attendants to determine the empty seats in the aircraft. Finally, in step 2014*a*, the routine set_upgrade_status is called to set the status for the seat-upgrade service to "started." Thus, the routine "seat upgrade initialization" is called when it is determined that the seat-upgrade service can be offered to passengers and initializes execution of the seat-upgrade service by sending seat-upgrade-request messages to flight attendants to elicit indications, from the flight attendants, of the empty seats in the aircraft.

Figure 20B:
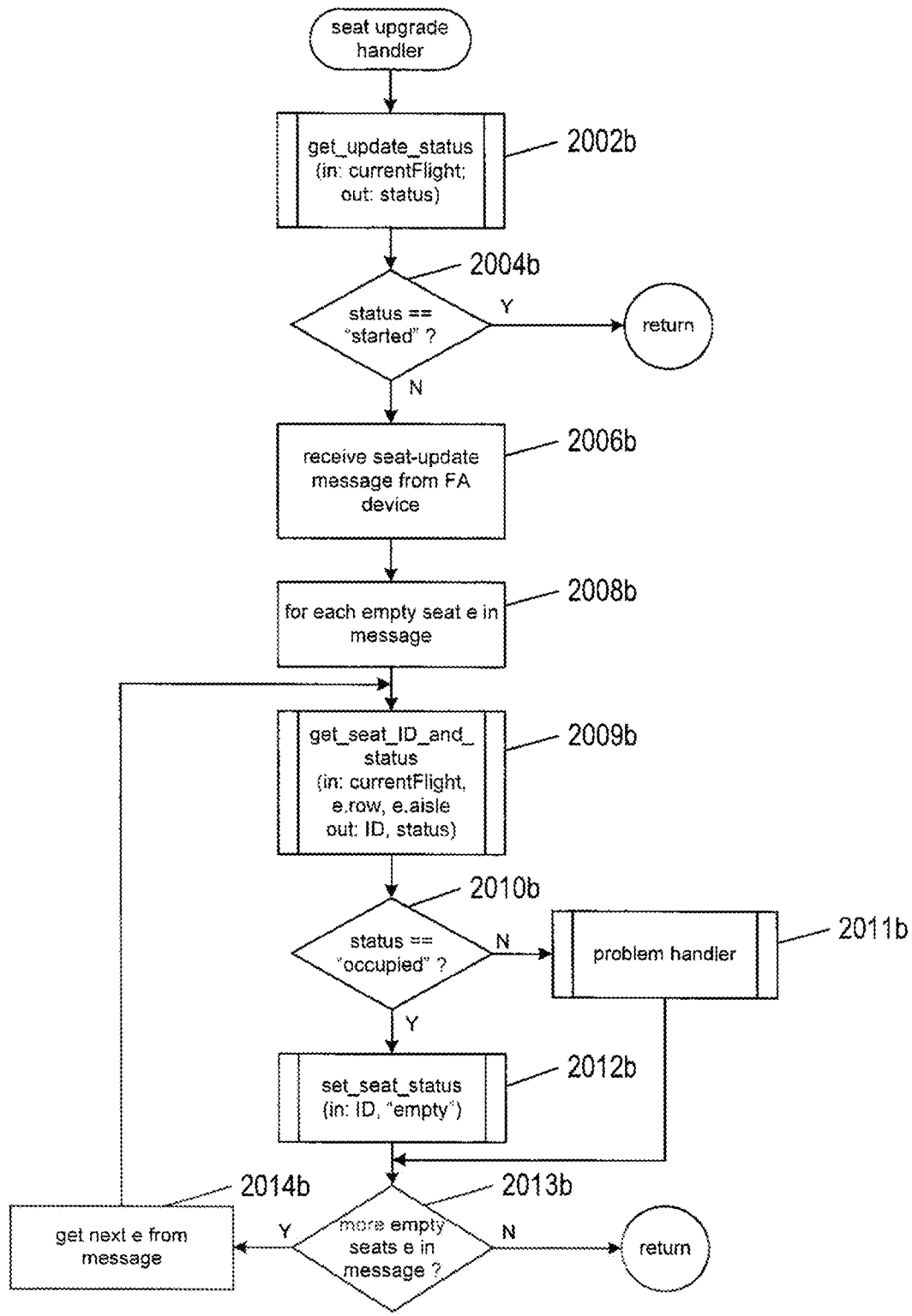

FIG. 20B shows a control-flow diagram for the handler seat update, called in step 2008 of FIG. 19. The handler "seat update" is called to handle receipt of seat-update messages provided by flight attendants in response to seat-upgrade-request messages. The messages report the empty seats identified by flight attendants. In step 2002*b*, the routine get_update_status is called to get the seat-upgrade-service status. If the status is not "started," as determined in stop 2004*b*, the handler "seat update" terminates. Otherwise, in step 2006*b*, the seat-update message is received from a flight-attendant device. In the for-loop of steps 2008*b*-2014*b*, each empty-seat entry e in the received message is processed. In step 2009*b*, the routine get_seat_ID_and_status is called to determine the identifier for the seat and the current status for the seat. If the current status of the seat is "occupied," as determined in step 2010*b*, a problem-handler routine is called, in step 2011*b*, to resolve the discrepancy. Otherwise, the status for the seat is set to "empty," in step 2012*b*.

Figure 20C:
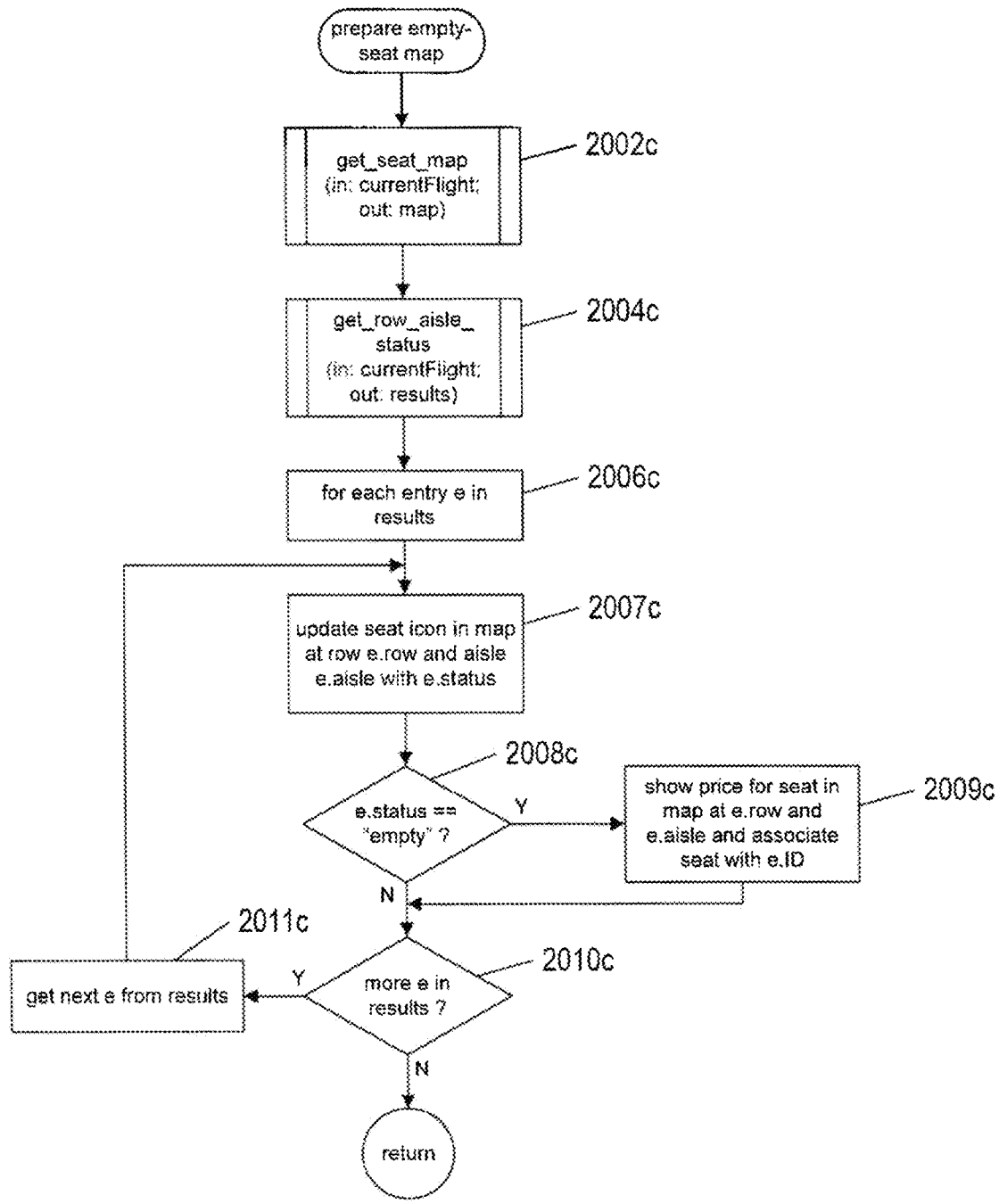

FIG. 20C shows a control-flow diagram for the routine "prepare empty-seat map," called in step 2006*d* of FIG. 20D, discussed below. In step 2002*c*, the routine get_seat_map is called to obtain the seat map for the current flight. In step 2004*c*, the routine get_role_aisle_status is called to the information for each seat in the flight. In the for-loop of steps 2006*c*-2011*e*, each entry c in the results returned by the routine get_role_aisle_status is considered. In step 2007*c*, the icon in the seat map is updated with the current status for the seat. When the current status for the seat is "empty," as determined in step 2008*c*, the icon for the seat is additionally updated to show the price for the seat and the identifier for the seat is associated with the seat icon in the seat map to facilitate later operations.

Figure 20D:
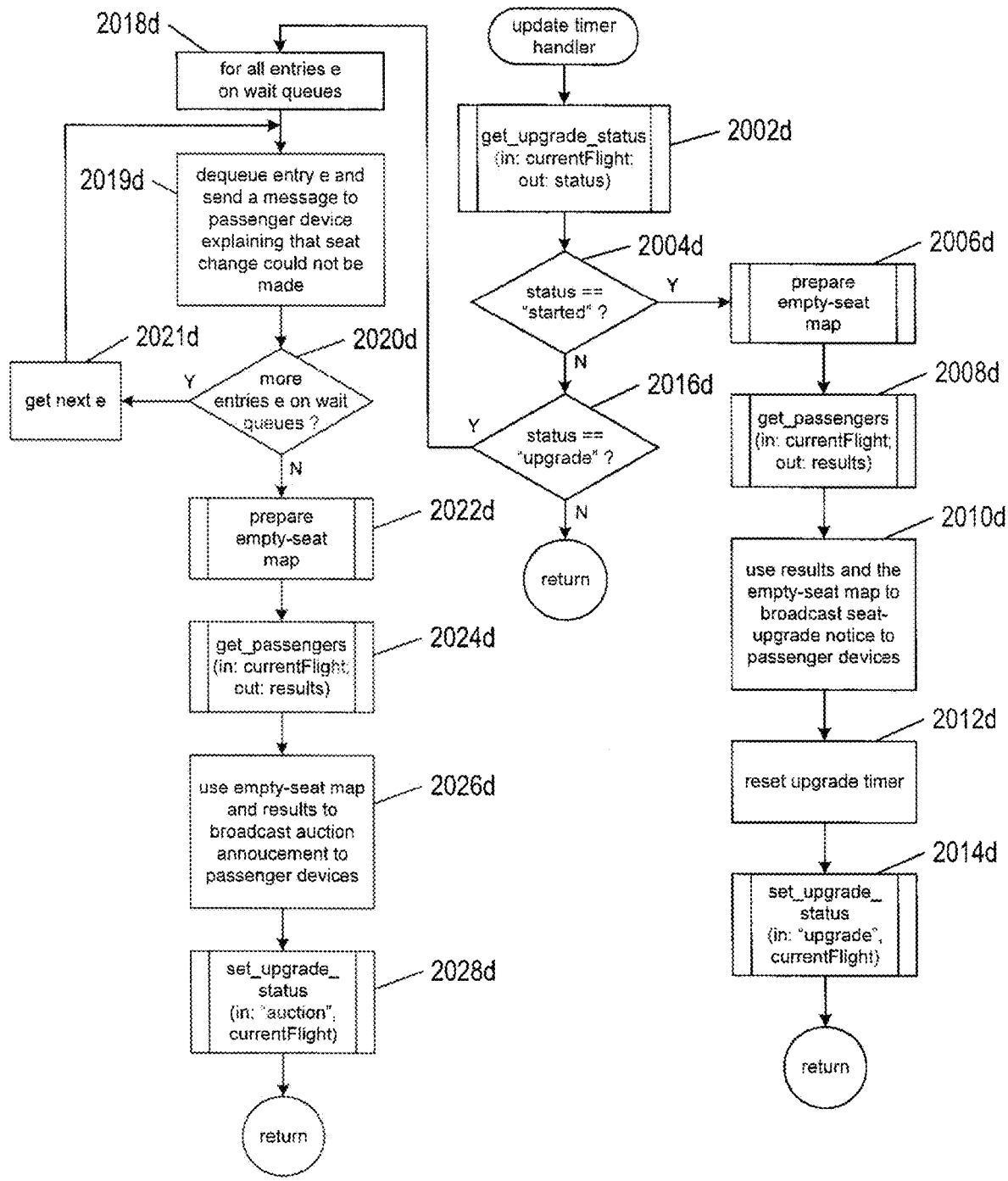

FIG. 20D shows a control-flow diagram for the handler "upgrade timer expiration," called in step 1924 of FIG. 19. The handler "upgrade timer expiration" is called when the upgrade timer expires, indicating, in one case, the end of the phase in which empty seats are identified by flight attendants and, in another case, the end of the passenger-initiated seat-upgrade phase of the seat-upgrade process. In step 2002*d*, the routine get_upgrade_status is called to determine the status for the seat-upgrade service. When the status is equal to "started," as determined in step 2004*d*, the current phase in which empty seats are identified, has terminated, and the routine "prepare empty-seat map" is called in step 2006*d*, to prepare an empty-seat map for broadcast to passengers. In step 2008*d*, the routine get_passengers is called to get information for the current passengers on the flight. In step 2010*d*, a seat-upgrade notice is broadcast to all the passengers, the notice including the empty-seat map generated in step 2006*d*. In step 2012*d*, the upgrade timer is reset, and, in step 2014*d*, the routine set_upgrade_status is called to change the status for the seat-upgrade service to "upgrade" and to start a next phase, in which passengers send requests for seat upgrades. When the status of the seat-upgrade service is "upgrade," as determined in step 2016*d*, the current phase, in which passengers send seat-change requests, has terminated. In the for-loop of steps 2018*d*-2021*d*, all of the entries in various wait queues representing seat-change requests that were not able to be allowed are processed in order to send messages to the corresponding passengers explaining that the requested seat change could not be made, in step 2019*d*. The various wait queues may also be deallocated, depending on the implementation. In step 2022*d*, the routine "prepare empty-seat map" is again called to generate a current empty-seat map. In step 2024*d*, the routine get passengers is called to get information about the passengers on the flight. In step 2026*d*, a seat-auction announcement is broadcast of the passengers to indicate that the remaining empty seats will be auctioned off. In step 2028*d*, the status for the seat-upgrade service is set to "auction." Thus, a seat-auction phase of the seat-upgrade process has begun.

Figure 20E:
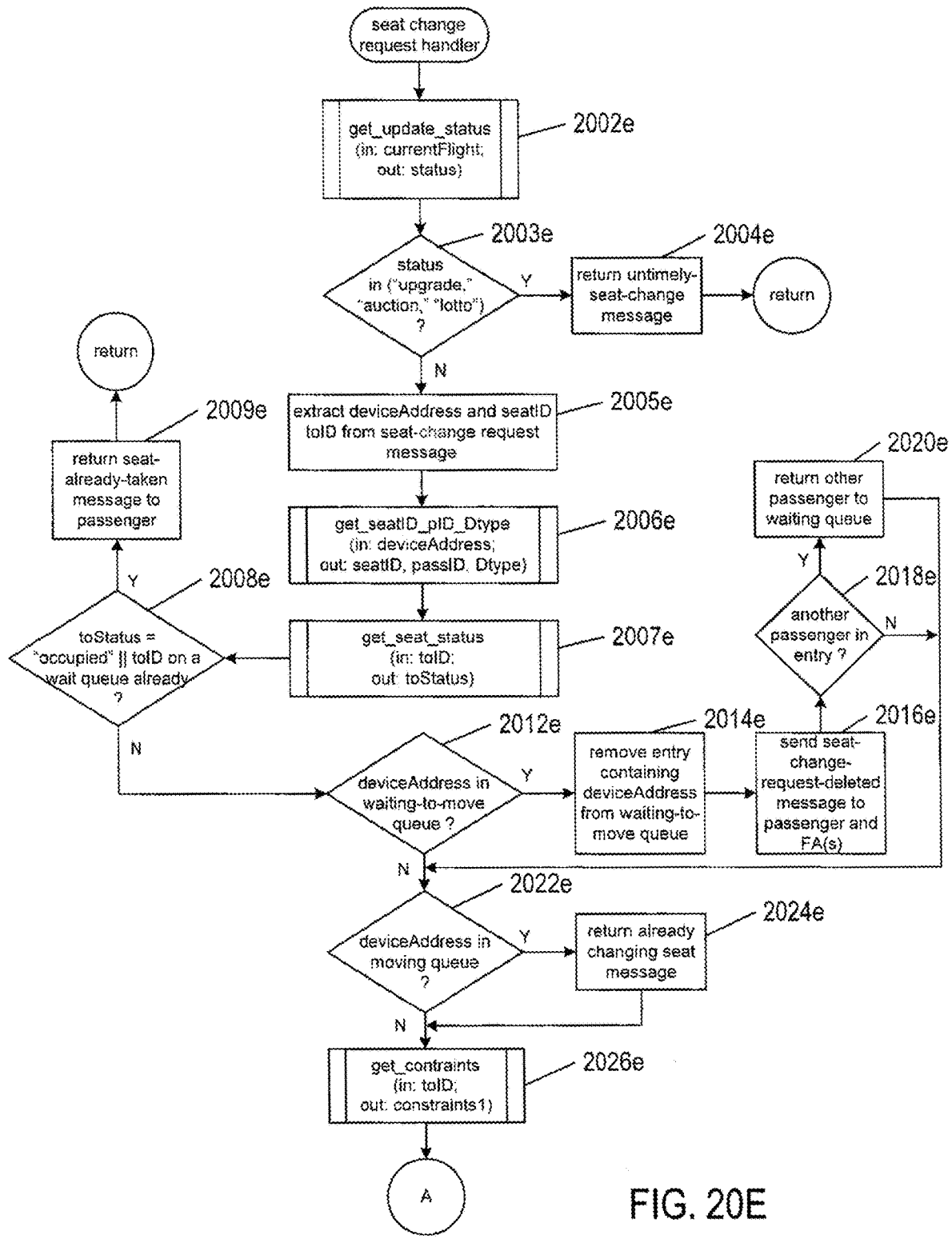
Figure 20F:
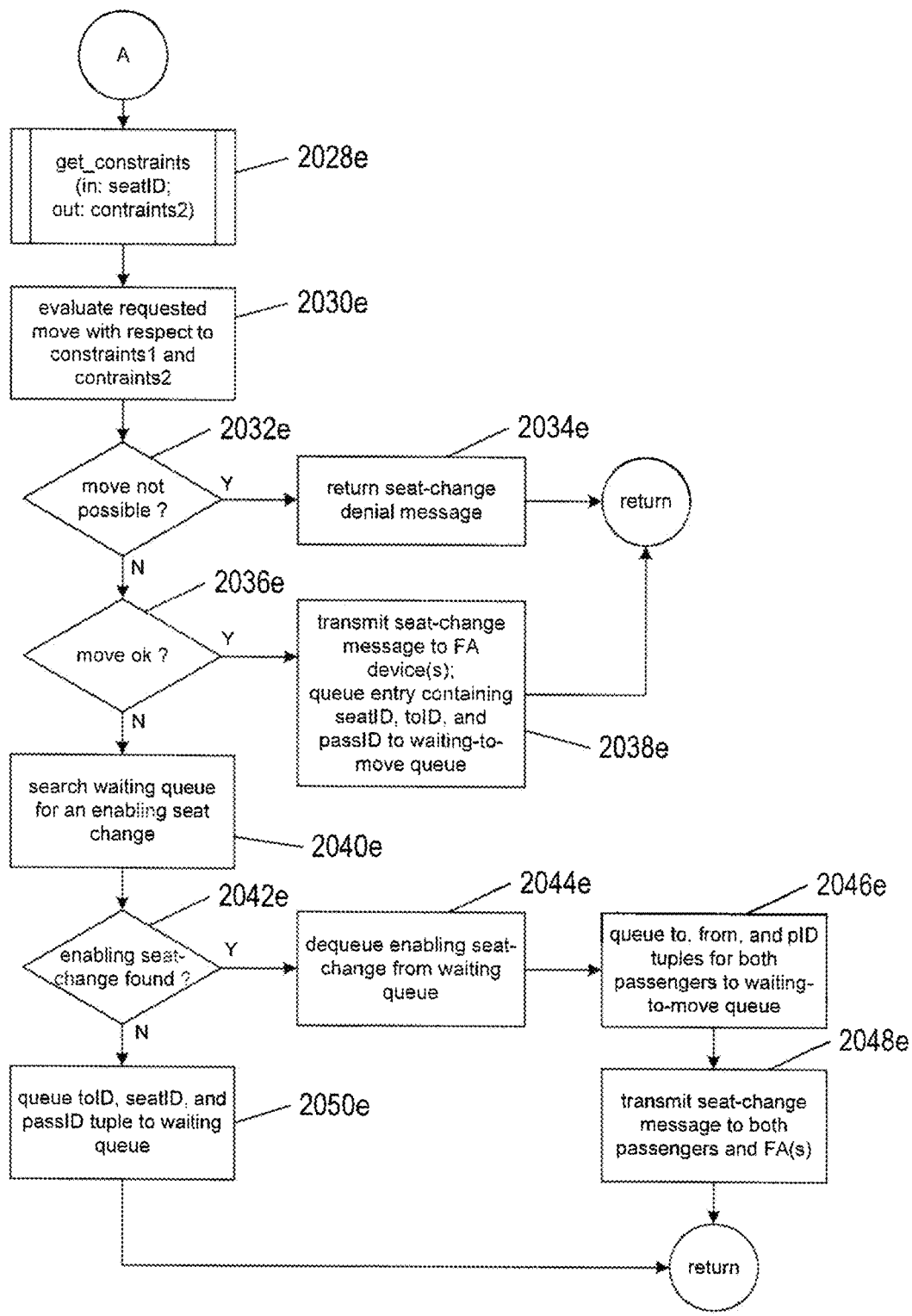

FIG. 20E shows a control-flow diagram for the handler "seat change request," called in step 1912 of FIG. 19. This handler processes a set-change request received from a passenger. In step 2002*e*, the routine get upgrade status is called to retrieve the status for the seat-upgrade service. If the status is not one of "upgrade," "auction," or "lotto," as determined in step 2003*e*, an untimely-seat-change message is returned to the requesting passenger, in step 2004*e*, and the handler "seat change request" terminates. Otherwise, in step 2005*e*, the device address and the identifier for the seat to which the passenger wishes to move are extracted from the seat-change-request message. In step 2006*e*, the routine get_seatID_PID_Dtype is called to determine the passenger identifier and current seat identifier for the passenger. In step 2007*e*, the routine get_seat_status is called to determine the status of the seat to which a move is requested. If the status of the seat is "occupied" or the toID identifier is already in a wait queue for an impending seat change, as determined in step 2008*e*, a seat-already-taken message is returned to the passenger, in step 2009*e*, and the handler "seat change request" terminates. If the passenger identifier is contained in an entry in a waiting-to-move queue, as determined in step 2012*e*, that entry is removed, in step 2014*e*, and a notification that the requested seat change has now been terminated is sent both to the flight attendant or flight attendants and to the passenger in step 2016*e*. Only one seat-change request can be processed, at any given time, for a passenger in the currently described implementation. In alternative implementations, a passenger may request multiple seat changes in a single request, with an indication of a preference order, if requesting multiple seat upgrades for himself or herself, or an indication of the other passengers for which seat upgrades are being requested, if requesting seat upgrades for multiple passengers. If there is another passenger in the removed entry, as determined in step 2018*e*, that passenger is returned to the waiting queue in step 2020*e*, so that the passenger's request may be subsequently approved and satisfied. This happens, as explained below, when two seat changes need to be processed together, due to constraints associated with seats. When the device address is contained in an entry in the moving queue, as determined in step 2022*e*, a message is sent to the passenger, in step 2024*e*, indicating that, since the passenger is already moving to a new seat, the seat-change request cannot be honored. In step 2026*e*, the constraints associated with the seat to which the passenger has requested to be moved is retrieved by a call to the routine get_constraints. Turning to FIG. 20F, the routine get_constraints is again called to retrieve the constraints for the passenger's current seat, in step 2028*e*. In step 2030*e*, the handler "seat change request" evaluates the requested seat change with reference to the constraints associated with the seats. If the move is not possible, as determined in step 2032*e*, then a seat-change-denial message is returned to the passenger, in step 2034*e*, and the handler "seat change request" terminates. If the move is compatible with the constraints, as determined in step 2036*e*, a seat-change message is sent to one or more flight-attendant devices and an entry for the requested seat change is added to the waiting-to-move queue, in step 2038*e*. Otherwise, the request to move requires that a complementary move be made by another passenger in order to satisfy the constraints associated with the seat change. For example, if a passenger is requesting to move from aisle A to aisle F, then the constraints may require another passenger to move from aisle F to aisle A. In step 2040*e*, the waiting queue is searched for another enabling requested seat change. If one is found, as determined in step 2042*e*, then the enabling seat change request is dequeued from the waiting queue and added to an entry, along with the currently requested seat change, that is queued to the waiting-to-move queue in step 2046*e*. In step 2048*e*, seat-change messages are transmitted to both passengers involved in the move and to one or more flight attendants. Otherwise, when no enabling additional seat-change request is found in step 2042*e*, the current seat-change request is queued to the waiting queue, in step 2050*e*.

Figure 20G:
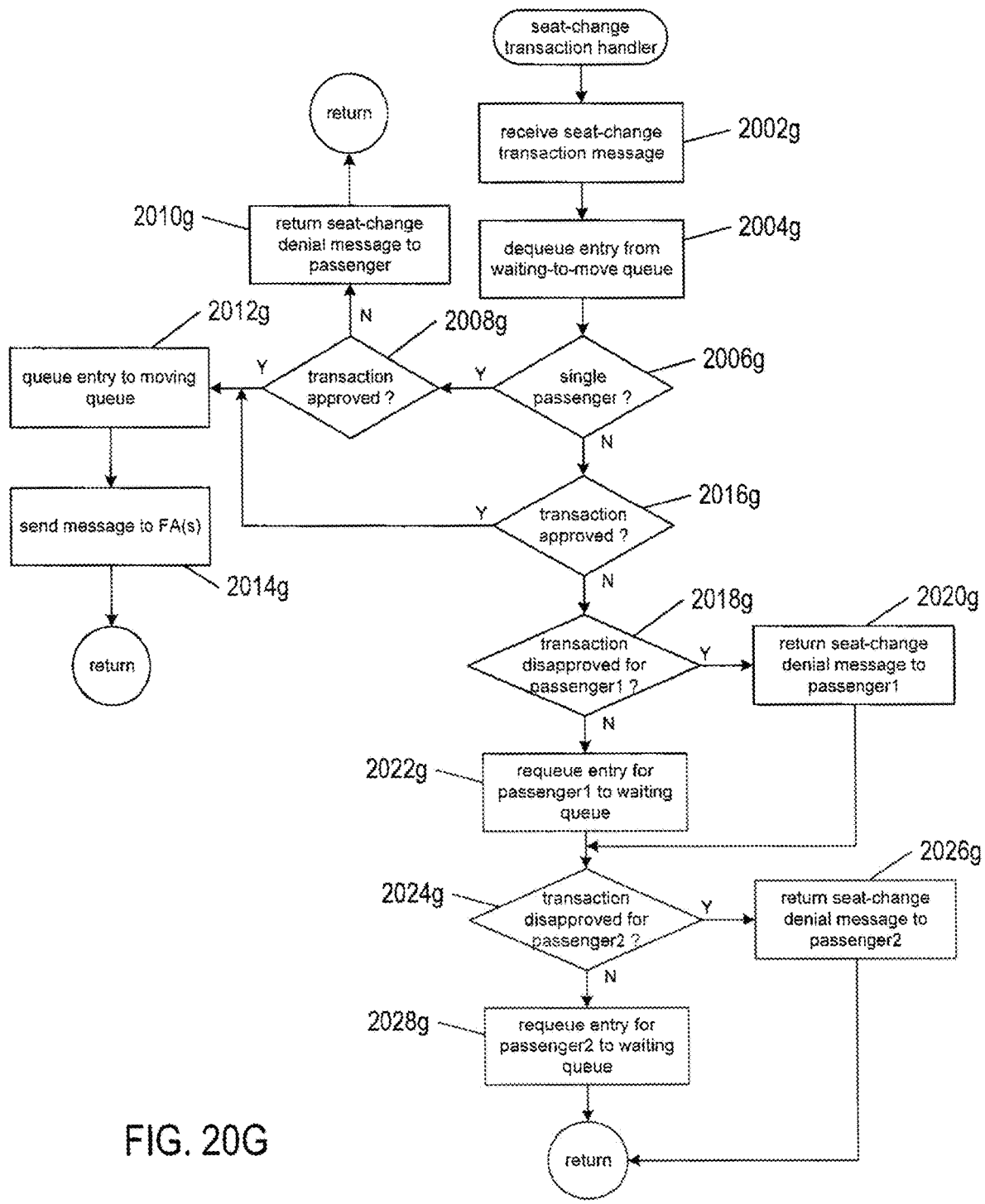

FIG. 20G shows a control-flow diagram for the handler "seat-change transaction," called in step 1916 of FIG. 19. The handler "seat-change transaction" is called to handle a seat-change-transaction message sent from a flight-attendant device indicating that the transaction for a requested seat change has been carried out. In step 2002*g*, the seat-change-transaction message is received. In step 2004*g*, the entry corresponding to the seat-change request is dequeued from the waiting-to-move queue. If the dequeued entry contains only a single passenger, as determined in step 2006*g*, then, if the transaction has not been approved, as determined in step 2008*g*, a seat-change denial message is sent to the passenger in step 2010*g*. Otherwise, when the transaction has been approved, as determined in step 2008*g*, an entry corresponding to the seat-change request is queued to the moving queue, in step 2012*g*, and a move message is sent to one or more flight attendants in step 2014*g*. When the dequeued entry represents two passengers, as determined in the step 2006*g*, and when the transaction has been approved, as determined in step 2016*g*, control flows to step 2012*g*. Otherwise, the transaction has been disapproved for the first of the two passengers, as determined in step 2018*g*, a seat-change denial messages sent to the first passenger in step 2020*g*. Otherwise, an entry for the passenger is queued to the waiting queue, in step 2022*g*. When the transaction was disapproved for the second passenger, as determined in step 2024*g*, a seat-change denial message is sent to the second passenger, in step 2026*g*. Otherwise an entry for the second passenger is queued to the waiting queue, in step 2028*g*.

Figure 20H:
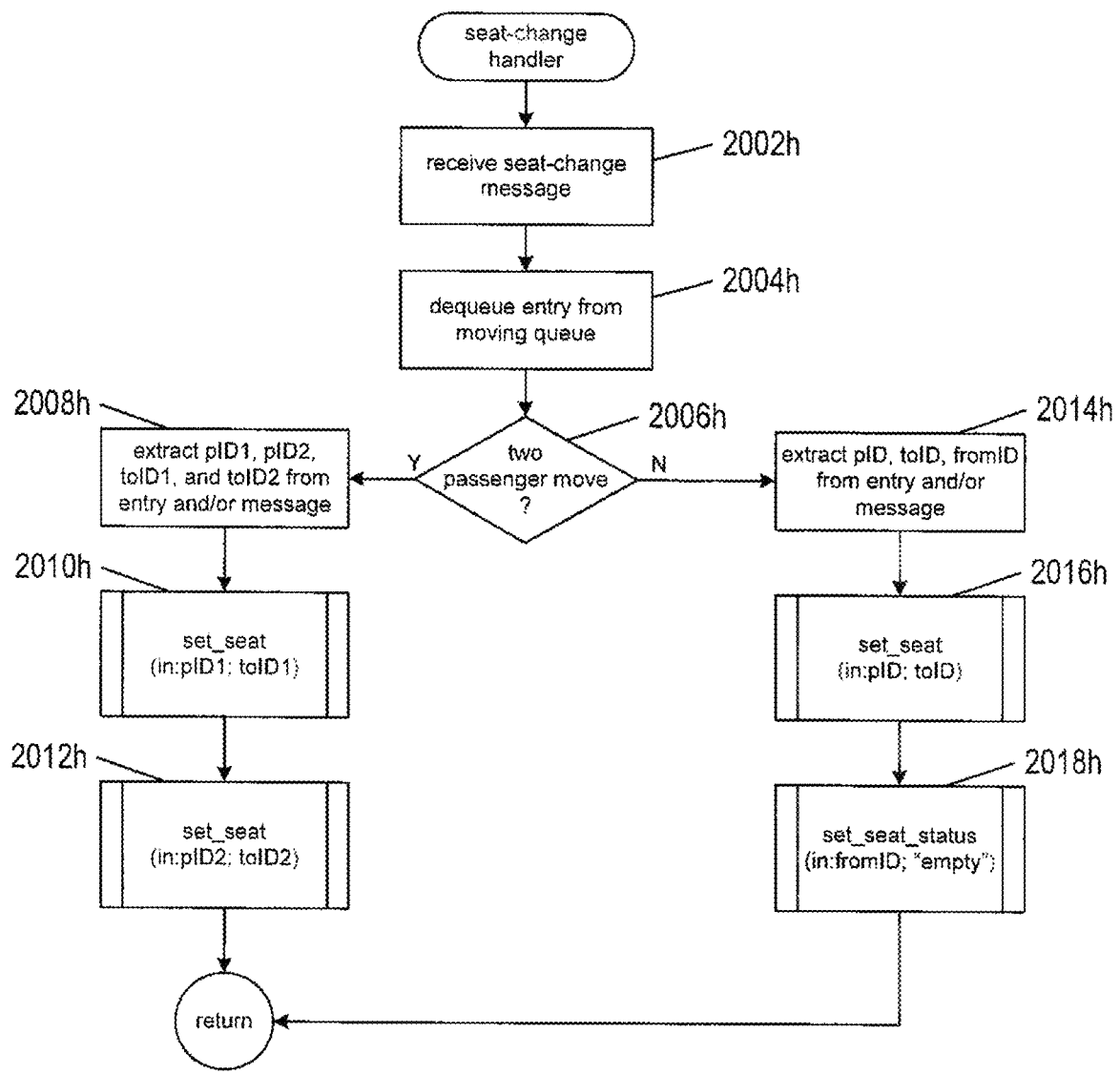

FIG. 20H shows a control-flow diagram for the handler "seat change," called in step 1920 of FIG. 19. The handler "seat change" is called when a flight-attendant device sends a seat-change message indicating that a requested and approved seat change has been carried out. In step 2002*h*, the seat-change message is received. In step 2004*h*, the corresponding entry is removed from the moving queue. In step 2006*h*, the handler "seat change" determines whether the dequeued entry is a two-passenger entry. If so, then in step 2008*h*, the passenger identifiers and seat identifiers are extracted from the dequeued entry and, in steps 2010*h* and 2012*h*, the routine set_seat is called to set the new seat identifiers for each passenger in the Passengers table. When the dequeued entry is a single-passenger entry, as determined in step 2006*h*, the passenger identifier and seat identifier information is extracted from the received message in step 2014*h* and the routines set_seat and set_seat_status are called, in steps 2016*h* and 2018*h*, to enter the seat identifier in the Passengers table and change the status of the passenger's current seat to "empty" in the SeatInfo table, respectively.

Figure 20I:
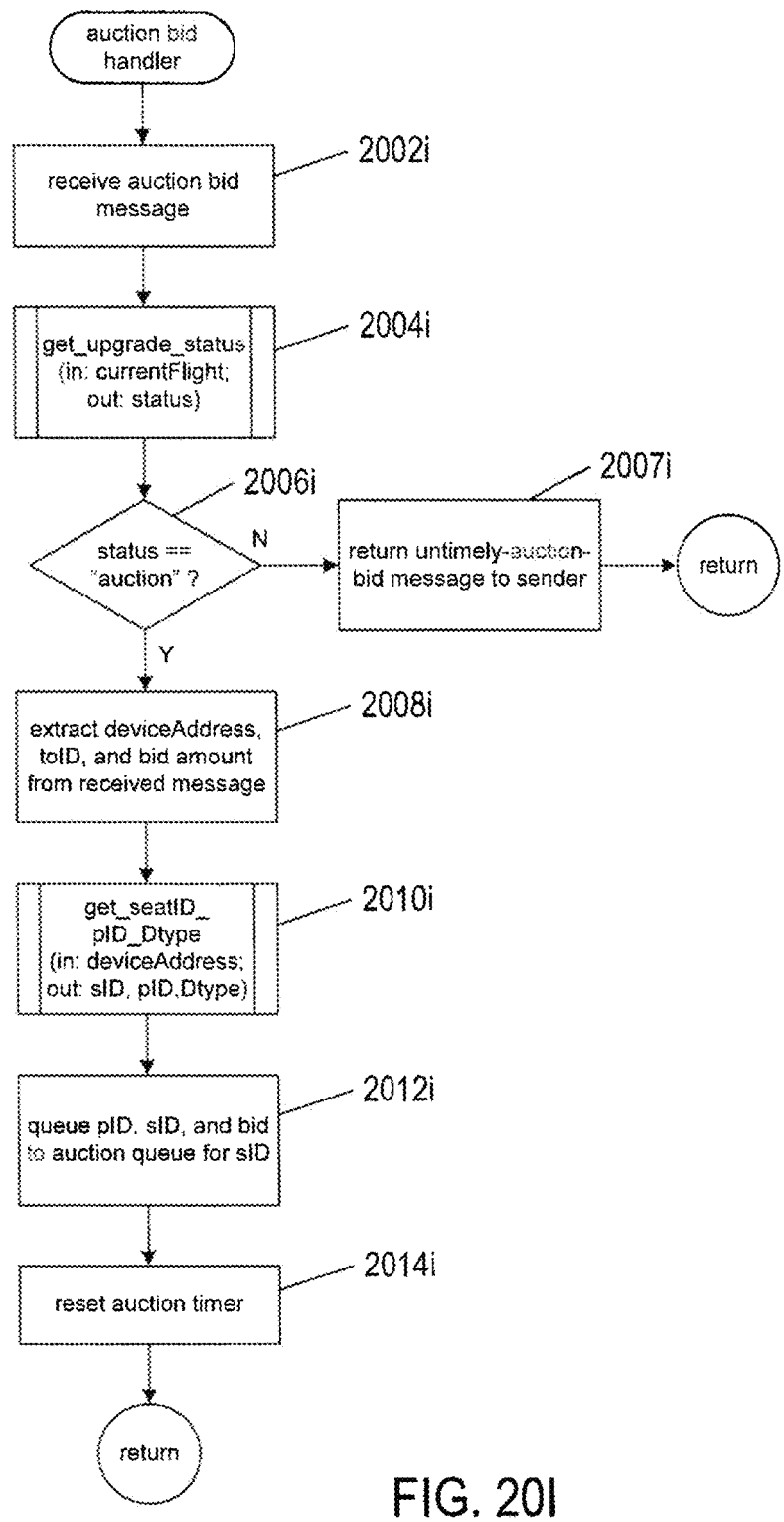

FIG. 20I shows a control-flow diagram for the handler "auction bid," called in step 1928 of FIG. 19. The handler "auction bid" is called when an auction-bid message is received from a passenger. In step 2002*i*, the auction-bid message is received. In step 2004*i*, the routine get_upgrade_status is called in order to obtain the status for the seat-upgrade service. When the status is not "auction," as determined in step 2006*i*, an untimely-auction-bid message is returned to the passenger, in step 2007*i*, and the handler "auction bid" terminates. Otherwise, in step 2008*i*, the device address, the seat identifier for the requested move, and the bid amount are extracted from the received message. In step 2010*i*, the routine get_seatID_PID_Dope is called to obtain the seat identifier and passenger identifier for the bidding passenger. In step 2012*i*, an entry is queued for the auction bid to the auction queue associated with the requested seat identifier. In step 2014*i*, the auction timer is reset.

Figure 20J:
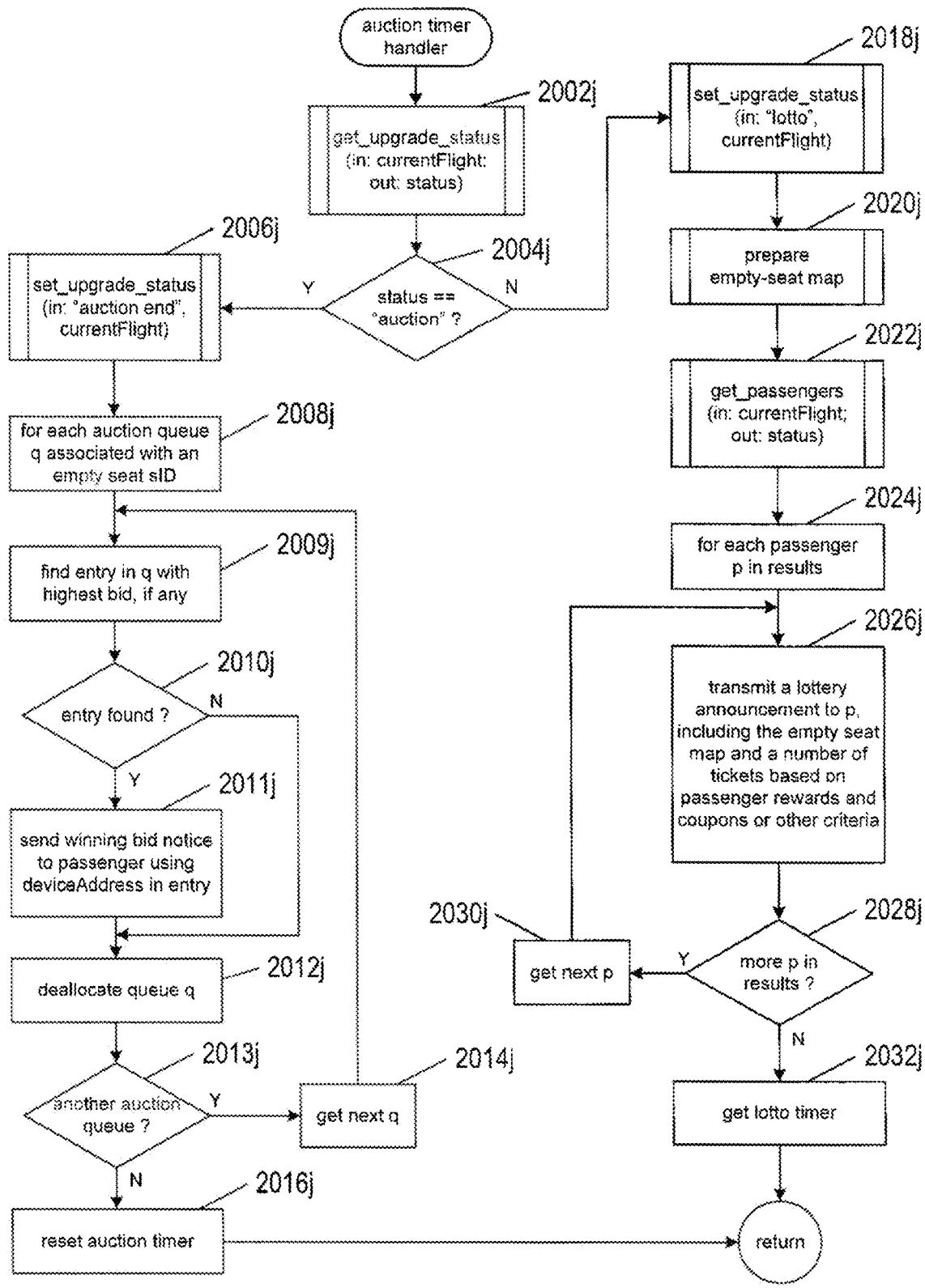

FIG. 20J shows a control-flow diagram for the handler auction timer called in step 1932 of FIG. 19. The handler "auction timer" is called when the auction timer expires. In step 2002*j*, the routine get_upgrade_status is called to get the status for the seat-upgrade service. When the status is equal to "auction," as determined in step 2004*j*, the routine set_upgrade_status is called, in step 2006*j*, to set the seat-upgrade-service status to "auction end." Then, in the for-loop of steps 2008*j*-2014*j*, each auction queue q associated with an empty seat is considered. In step 2009*j*, the entry in the auction queue q representing the highest bid, if any, is found. If an entry is found, as determined in step 2010*j*, then a winning-bid notice is sent to the passenger in step 2011*j*. The auction queue q is then deallocated, in step 2012*j*. At the completion of the for-loop, the auction timer is reset. When the seat-upgrade-service status is "auction end," as determined in step 2004*j*, the routine set_upgrade_status is called, in step 2018*j*, to set the seat-upgrade-service status to "lotto," to initiate a fional lottery phase of the seat-update process. In step 2020*j*, the routine "prepare empty-seat map" is called. In step 2022*j*, the routine get_passengers is called to obtain information for all of the passengers on the flight. In the for-loop of steps 2024*j*-2030*j*, a lottery announcement is transmitted to each of the passengers. The lottery announcement includes the empty seat map as well as an indication of the number of lottery tickets provided to the passenger based on the passenger's rewards and coupons or on additional criteria. Then, in step 2032*j*, the lotto timer is set.

Figure 20K:
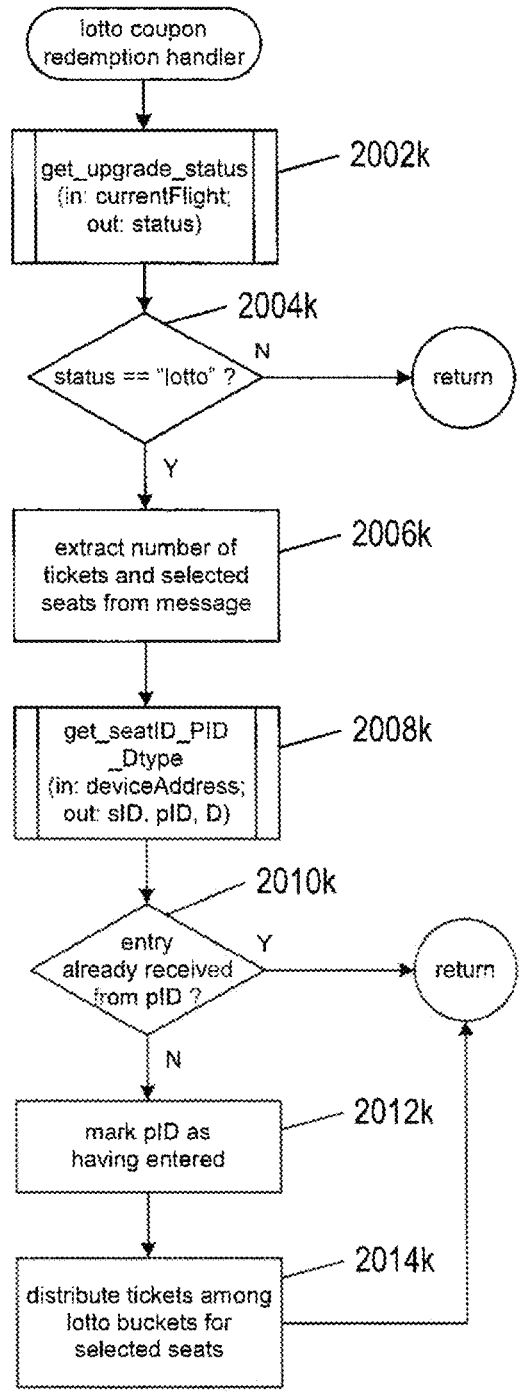

FIG. 20K shows a control-flow diagram for the handler "lotto coupon redemption," called in step 1936 of FIG. 19. The handler "lotto coupon redemption" is called when a lotto-entry message is received from a passenger. In step 2002*k*, the routine get_upgrade_status is called in order to obtain the current seat-upgrade-service status. When the status is not "lotto," as determined in step 2004*k*, the handler "lotto coupon redemption" terminates. Otherwise, in step 2006*k*, indications of the number of tickets and selected empty seats are extracted from the received lotto-entry message. In step 2008*k*, the routine get_seat_ID_PID_Dtype is called to get the passenger identifier and seat identifier for the passenger who sent the lotto-entry message. If a lotto-entry message has already been received from the passenger, as determined in step 2010k, the handler "lotto coupon redemption" terminates. Otherwise, in step 2012k, the passenger is marked as having entered the lottery and, in step 2014k, the passenger's tickets are distributed among the lotto buckets associated with the seats selected by the passenger.

Figure 20L:
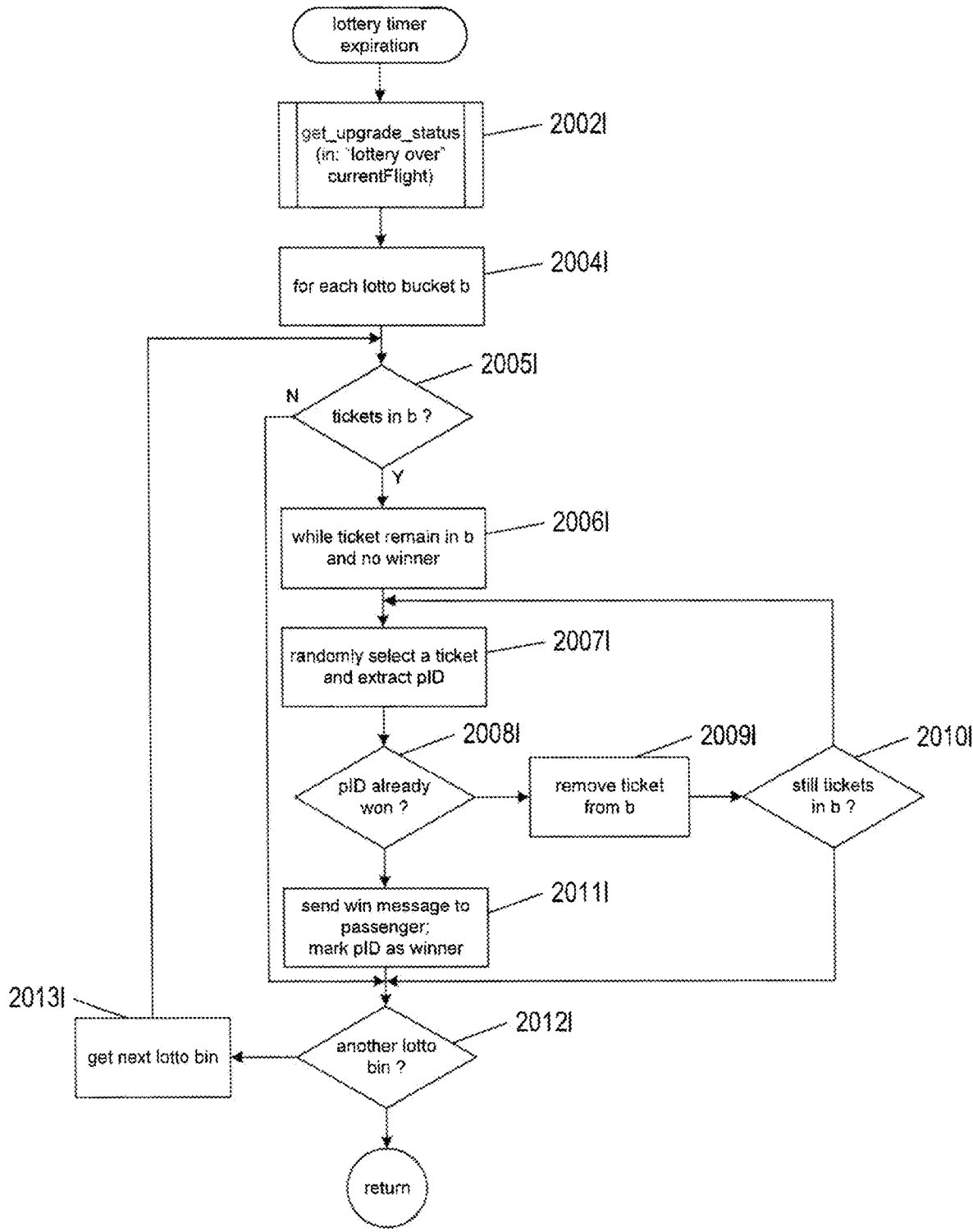

FIG. 20L shows a control-flow diagram for the routine "lotto timer expiration," called in step 1940 of FIG. 19. The routine "lotto timer expiration" is called when the lotto timer expires. In step 20021, the routine set_upgrade_status is called to obtain the current seat-upgrade-service status. In the for-loop of steps 20041-20131, each lotto bucket b associated with an empty seat is considered. If there are any tickets in the lotto bucket, as determined in step 20051, then in the while-loop of steps 20061-20111, a ticket is randomly selected from the lotto bucket until either a winner is found, in which case a win message is sent to the passenger corresponding to the ticket, in step 20111, or until there are no more tickets in the lotto bucket, as determined in step 20101.

Although the present invention has been described in terms of particular embodiments, it is not intended that the invention be limited to these embodiments. Modifications within the spirit of the invention will be apparent to those skilled in the art. For example, any of a variety of different implementations of the service-and-transaction system can be obtained by varying any of many different design and implementation parameters, including modular organization, programming language, underlying operating system, control structures, data structures, and other such design and implementation parameters. As discussed above, for example, a variety of different levels of inner cooperation between transportation-personnel applications/devices may be incorporated into various different implementations of the STS. The STS can monitor locations of transportation personnel in order to direct the nearest attendant to a service-requesting passenger and to optimize service-request processing by transportation personnel. A variety of different approaches to auction-based and lottery-based seat reassignments are possible. Many different configurations of individual hub systems within a transportation vehicle are possible, with many different patterns of interaction between the hub systems and external cloud-computing facilities as well as with transportation-personnel devices/applications. There are many different possible approaches to designing and implementing databases for storing the many different types of information relevant to service-request reception and processing. Only a small portion of the many different possible services that can be provided by an STS are discussed in the above description of the STS. In fact, an almost limitless number of different types of services and transactions can be supported by various implementations of the above-described STS.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A semi-automated, distributed service-and-transaction system ("STS") comprising
    processor-controlled passenger devices that each provide an execution environment for a client application or web browser;
    processor-controlled transportation-personnel devices that each provide an execution environment for a service-provision application or web browser;
    an on-board hub-and-server component, comprising one or more hub-and-server systems that each interfaces to a subset of the processor-controlled passenger devices and a subset of the processor-controlled transportation-personnel devices, installed within a transportation vehicle that interconnects the processor-controlled passenger devices and processor-controlled transportation-personnel devices with one another and with STS applications and services executing on the on-board hub-and-server component that are, in turn, interconnected with a remote STS backend application; and
    a remote cloud-computing facility that provides a distributed execution environment for the STS backend application.

2. A semi-automated, distributed service-and-transaction system ("STS") comprising:
    processor-controlled passenger devices that each provide an execution environment for a client application or web browser;
    processor-controlled transportation-personnel devices that each provides, to transportation personnel, including flight attendants, an execution environment for a service-provision application or web browser;
    an on-board hub-and-server component installed within a transportation vehicle that interconnects the processor-controlled passenger devices and processor-controlled transportation-personnel devices with one another and with STS applications and services executing on the on-board hub-and-server component that are, in turn, interconnected with a remote STS backend application; and
    a remote cloud-computing facility that provides a distributed execution environment for the STS backend application;
    the semi-automated, distributed service-and-transaction system providing
        service-and-transaction facilities to passengers within aircraft, and
        a seat-upgrade service that allows unoccupied seats within an aircraft to be distributed among passengers boarded for a flight when no further passengers can board the aircraft wherein, when one or more of the STS applications receive and compile empty-seat information provided by flight attendants following launch of the seat-upgrade service, one or more of the STS applications transmit seat-upgrade notifications to passenger devices.

3. A semi-automated, distributed service-and-transaction system ("STS") comprising:
    processor-controlled passenger devices that each provide an execution environment for a client application or web browser;
    processor-controlled transportation-personnel devices that each provides, to transportation personnel, including flight attendants, an execution environment for a service-provision application or web browser;
    an on-board hub-and-server component installed within a transportation vehicle that interconnects the processor-controlled passenger devices and processor-controlled transportation-personnel devices with one another and with STS applications and services executing on the on-board hub-and-server component that are, in turn, interconnected with a remote STS backend application; and a remote cloud-computing facility that provides a distributed execution environment for the STS backend application;

the semi-automated, distributed service-and-transaction system providing service-and-transaction facilities to passengers within aircraft, and a seat-upgrade service that allows unoccupied seats within an aircraft to be distributed among passengers boarded for a flight when no further passengers can board the aircraft wherein, when a passenger requests a seat change in response to receiving a seat-change notification, a seat-change request is transmitted by the passenger's device to one or more of the STS applications;

the one or more of the STS applications determine whether or not the seat-change request can be satisfied, and when the seat-change request can be satisfied, the one or more of the STS applications transmit a seat-change notification to one or more transportation-personnel devices.

4. A semi-automated, distributed service-and-transaction system ("STS") comprising:

processor-controlled passenger devices that each provide an execution environment for a client application or web browser;

processor-controlled transportation-personnel devices that each provides, to transportation personnel, including flight attendants, an execution environment for a service-provision application or web browser;

an on-board hub-and-server component installed within a transportation vehicle that interconnects the processor-controlled passenger devices and processor-controlled transportation-personnel devices with one another and with STS applications and services executing on the on-board hub-and-server component that are, in turn, interconnected with a remote STS backend application; and a remote cloud-computing facility that provides a distributed execution environment for the STS backend application;

the semi-automated, distributed service-and-transaction system providing service-and-transaction facilities to passengers within aircraft, and a seat-upgrade service that allows unoccupied seats within an aircraft to be distributed among passengers boarded for a flight when no further passengers can board the aircraft wherein, when a flight attendant receives a seat-change notification from an STS application, the flight attendant navigates to a passenger identified in the seat-change notification, conducts a seat-upgrade transaction with the passenger via the flight-attendant's transportation-personnel device and one or more of the STS applications, and transmits a seat-change-transaction-completion notice, via the flight-attendant's transportation-personnel device, to one or more of the STS applications.

5. A semi-automated, distributed service-and-transaction system ("STS") comprising:

processor-controlled passenger devices that each provide an execution environment for a client application or web browser;

processor-controlled transportation-personnel devices that each provides, to transportation personnel, including flight attendants, an execution environment for a service-provision application or web browser;

an on-board hub-and-server component installed within a transportation vehicle that interconnects the processor-controlled passenger devices and processor-controlled transportation-personnel devices with one another and with STS applications and services executing on the on-board hub-and-server component that are, in turn, interconnected with a remote STS backend application; and a remote cloud-computing facility that provides a distributed execution environment for the STS backend application;

the semi-automated, distributed service-and-transaction system providing service-and-transaction facilities to passengers within aircraft, and a seat-upgrade service that allows unoccupied seats within an aircraft to be distributed among passengers boarded for a flight when no further passengers can board the aircraft wherein, when one or more of the STS applications receive a seat-change-transaction-completion notice from a flight-attendant's transportation-personnel device, the one or more STS applications update the local database to reflect the seat change and transmit an authorization message to the flight-attendant's transportation-personnel device.

6. A method that provides services and transactions to passengers within an aircraft, the method comprising:

downloading and installing a client application on processor-controlled passenger devices within the aircraft and/or providing, to the processor-controlled passenger devices, access to one or more web services;

downloading and installing a flight-attendant application on processor-controlled transportation-personnel devices within the aircraft and/or providing, to the processor-controlled transportation-personnel devices, access to one or more web services;

installing an on-board hub-and-server component, comprising one or more hub-and-server systems, each hub-and-server system interfacing to a subset of the processor-controlled passenger devices and a subset of the processor-controlled transportation-personnel devices, within the aircraft to interconnect the processor-controlled passenger devices and processor-controlled transportation-personnel devices with one another and with STS applications and services that execute within the on-board hub-and-server component and that are, in turn, interconnected with a remote distributed STS backend application; and installing and launching the distributed STS backend application on one or more remote cloud-computing facilities.

* * * * *